US010801558B2

(12) United States Patent
Horiguchi et al.

(10) Patent No.: US 10,801,558 B2
(45) Date of Patent: Oct. 13, 2020

(54) SYNCHROMESH MECHANISM AND TRANSMISSION

(71) Applicant: Kyowa Metal Works Co., Ltd., Kanagawa-ken (JP)

(72) Inventors: Hirotaka Horiguchi, Kanagawa-ken (JP); Kotei Takahashi, Kanagawa-ken (JP); Ryo Yagi, Kanagawa-ken (JP)

(73) Assignee: Kyowa Metal Works Co., Ltd., Kanagawa-ken (JP)

(*) Notice: Subject to any disclaimer, the term of this patent is extended or adjusted under 35 U.S.C. 154(b) by 652 days.

(21) Appl. No.: 15/602,416

(22) Filed: May 23, 2017

(65) Prior Publication Data

US 2017/0343056 A1    Nov. 30, 2017

(30) Foreign Application Priority Data

May 24, 2016   (JP) ................................. 2016-103156
Apr. 21, 2017   (JP) ................................. 2017-084665

(51) Int. Cl.
| F16H 3/12 | (2006.01) |
| F16H 63/30 | (2006.01) |
| B60W 10/10 | (2012.01) |
| F16D 23/06 | (2006.01) |
| F16H 61/36 | (2006.01) |
| B60W 10/11 | (2012.01) |

(52) U.S. Cl.
CPC .............. *F16D 23/06* (2013.01); *F16H 3/12* (2013.01); *F16H 61/36* (2013.01); *F16H 63/30* (2013.01); *B60W 10/10* (2013.01); *B60W 10/11* (2013.01); *F16D 2023/0631* (2013.01)

(58) Field of Classification Search
CPC ..... F16D 23/06; F16D 2023/0631; F16H 3/12
USPC .......................................................... 74/339
See application file for complete search history.

(56) References Cited

U.S. PATENT DOCUMENTS

| 4,660,707 | A | * | 4/1987 | Sadanori ................. F16D 23/06 |
| | | | | 192/53.34 |
| 5,036,719 | A | * | 8/1991 | Razzacki ............... F16D 23/025 |
| | | | | 192/53.34 |
| 5,531,305 | A | * | 7/1996 | Roberts ................... F16D 23/06 |
| | | | | 192/53.332 |
| 5,620,075 | A | * | 4/1997 | Larsen .................... F16D 23/06 |
| | | | | 192/53.34 |
| 7,506,739 | B2 | * | 3/2009 | Razzacki ................ F16D 23/06 |
| | | | | 192/53.3 |

FOREIGN PATENT DOCUMENTS

| JP | 05-141488 | 6/1993 |
| JP | 09-042314 | 2/1997 |
| JP | 09-089002 | 3/1997 |

* cited by examiner

*Primary Examiner* — Ha Dinh Ho
(74) *Attorney, Agent, or Firm* — Wenderoth, Lind & Ponack, L.L.P.

(57) ABSTRACT

A synchromesh mechanism includes a shaft, a shift sleeve, a first gear and a second gear arranged at the both sides of a hub, and a first synchronizer ring and a second synchronizer ring arranged at the both side of the hub. The shift sleeve has a length so that it can start contacting with the first synchronizer ring and the second synchronizer ring at the same time.

11 Claims, 17 Drawing Sheets

SYNCHROMESH MECHANISM AND TRANSMISSION

BACKGROUND OF THE INVENTION

1. Field of the Invention

The present invention relates to a synchromesh mechanism that is cable of shifting rapidly and a transmission using the synchromesh mechanism.

2. Description of the Related Art

A conventional synchromesh mechanisms is disclosed in Japanese Patent Application Laying-Open publication No. Hei 5-141488, Hei 9-042314 and Hei 9-089002.

The conventional synchromesh mechanism includes two gears, a shift sleeve, a plurality of insert members (synchronizer keys), a hub portion of a shaft, two dog clutch gears, two cone portions and two synchronizer rings.

The shift sleeve is formed with splines on its inner surface, and the hub portion of the shaft is formed with splines at a radially outer side of the hub portion. They are always engaged with each other so that the shift sleeve can move in an axial direction toward one of the gears. When the shift sleeve is shifted toward one of the gears, it pushes the synchronizer ring through the insert members. This contacts the synchronizer ring to the cone portion to generate frictional torque. In this synchronization period, the insert members contact to the dog clutch gear to hold further advancing of the shift sleeve. When the synchronization period is finished, the shift sleeve pushes the insert members in a radially inward to advance and engage with the dog clutch gear. This is an end of the gear shifting.

The above known conventional synchromesh mechanism, however, encounters a problem in that, when the synchromesh mechanism is shifted, there is a neutral period between disengagement from one of the dog clutch gear to engagement of the other dog clutch gear. This provides cutting off of power and a driver feels free running of a motor vehicle. This feeling is notable when it is used in a motor vehicle with an automatic transmission.

It is, therefore, an object of the present invention to provide a synchromesh mechanism and a transmission which overcomes the foregoing drawbacks and can suppress cutting off of power when a shift sleeve is shifted from one gear toward the other gear and accordingly suppress a driver's feeling of free running of a motor vehicle.

SUMMARY OF THE INVENTION

According to an aspect of the present invention there is provided a synchromesh mechanism including a shaft, the shaft being formed with a hub having splines at a radially outer side; a first gear that is freely rotatable on the shaft, the first gear having a first dog clutch gear, and the first gear having a first cone portion with a friction surface projecting toward the hub; a second gear that is freely rotatable on the shaft, the second gear having a second dog clutch gear, and the second gear having a second cone portion with a friction surface projecting toward the hub; a shift sleeve having splines on an inter surface engaged with the splines of the shaft to relatively move in an axial direction and be engageable with one of the first dog clutch gear and the second dog clutch gear, both end sides of the splines of the shift sleeve having chamfers; a first synchronizer ring that is arranged between the first cone portion of the first gear and hub, the first synchronizer ring having a frictional surface on an inner surface that is capable of contacting with the first cone portion of the first gear to generate frictional torque, and the first synchronizer ring having splines with chamfers; and a second synchronizer ring that is arranged between the second cone portion of the second gear and the hub, the second synchronizer ring having a frictional surface on an inner surface that is capable of contacting with the second cone portion of the second gear to generate frictional torque, and the second synchronizer ring having splines with chamfers. The shift sleeve is designed to have a length such that the chamfers of one of the end sides of the splines of the shift sleeve can contact the chamfers of the splines of the first synchronizer ring and, at a same time, the chamfers of another of the end sides of the splines of the shift sleeve contact the chamfers of the splines of the second synchronizer ring.

Therefore, when the gear is shifted from the first gear to the second gear, the synchromesh mechanism can decrease a time from that the shift sleeve is disengaged from the first gear to that it pushes directly or indirectly the second synchronizer ring on the second cone portion to generate the frictional torque, and when the gear is shifted from the second gear to the first gear, the synchromesh mechanism can decrease a time from that the shift sleeve is disengaged from the second gear to that it pushes directly or indirectly the first synchronizer ring on the first cone portion of the first gear to generate the frictional torque. So the synchromesh mechanism can suppress the cutting off of power when the gear is shifted, and it can also suppress a driver's feeling of free running of the motor vehicle.

Probably, the shift sleeve may have a length so that, when it is shifted from an engagement state of the second gear toward the first gear, it indirectly pushes the first synchronizer ring to contact with the first cone portion of the first gear at least before the second gear is disengaged.

Therefore, the synchromesh mechanism can suppress the cutting off of power when the gear is shifted, and it can suppress a driver's feeling of free running of the motor vehicle.

Preferably, the shift sleeve may have a maximum length so that a contact of the second gear and a contact of the first synchronize ring cause only at a different time in a case where it is shifted from an engagement state of the second gear toward the first gear.

Therefore, the synchromesh mechanism can suppress the cutting off of power when the gear is shifted, and it can suppress a driver's feeling of free running of the motor vehicle.

Preferably, the second gear may have a slanted surface so that the second gear can contact with the shift sleeve due to a relative rotation between the second gear and the shift sleeve, and the second gear pushes the shift sleeve toward the first gear in a case where the shift sleeve is shifted from an engagement state of the second gear toward the first gear.

Therefore, the synchromesh mechanism can decrease operating force so that shift can sleeve indirectly push the first synchronizer ring to the first cone portion of the first gear to generate the frictional torque.

Preferably, the synchromesh mechanism further has a plurality of synchronizer keys, and the synchronizer keys have a projecting portion on its outer side. The synchromesh mechanism is formed with a first circumferential groove and a second circumferential groove in the axial direction. The first circumferential groove and the second circumferential groove have a deepest center portion and slopes extending from the deepest center portion. The projecting portions are slidable on one of the first circumferential groove and the second circumferential groove.

Therefore, the shift sleeve can be shifted rapidly when it is shifted from the first gear to the second gear or from the second gear to the first gear.

Preferably, the synchromesh mechanism further has a plurality of synchronizer keys, and the synchronizer keys are formed with a first circumferential groove and a second circumferential groove in the axial direction. The first circumferential groove and the second circumferential groove have a deepest center portion and slopes extending from the deepest center portion. The shift sleeve has a projecting portion extending in a radially inward at its center position to be slidable on one of the first circumferential groove and the second circumferential groove.

Therefore, the shift sleeve can be shifted rapidly when it is shifted from the first gear to the second gear or from the second gear to the first gear.

Preferably, the synchromesh mechanism described above may be used for a transmission alternately shifting successive speeds.

Therefore, the synchromesh mechanism can suppress cutting off of the power when the shift sleeve is shifted. So the transmission can suppress the cutting off of the power when the gear is shifted, and it can suppress a driver's feeling of free running of the motor vehicle.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
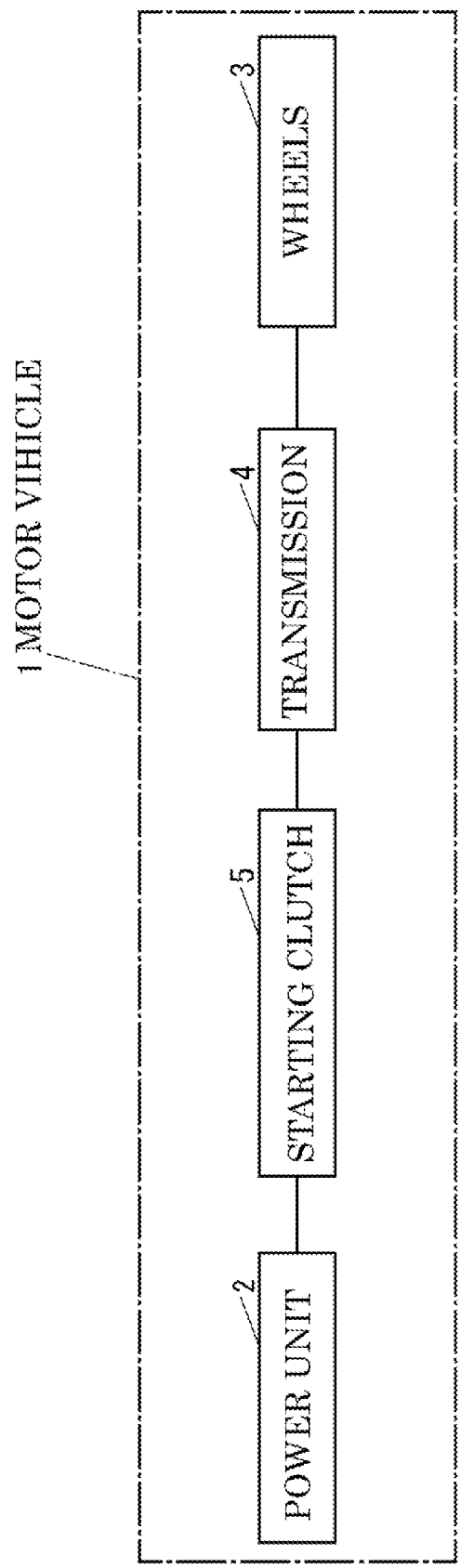
FIG. 1 is a block diagram showing a power system of a motor vehicle for which a synchromesh mechanism of a first embodiment according to the present invention is used.

Throughout the following detailed description, similar reference characters and numbers refer to similar elements in all figures of the drawings, and their descriptions are omitted for eliminating duplication.

Referring to FIG. 1 of the drawings, there is shown a motor vehicle for which a synchromesh mechanism of a first embodiment is used.

The motor vehicle 1 is equipped with a power unit 2, a starting clutch 5, and a transmission 4, wheels 3 and so on. The power unit 2 employs an internal combustion engine, but it may employ an electric motor/generator, or others. When the electric motor/generator is employed, the starting clutch 5 is not necessary. The transmission 4 has a plurality gear pairs to establish a plurality of speeds and a plurality gear shifting part shifting the gear pairs. An output of the transmission 4 is sent to a not-shown final drive that provides a final reduced ratio, and then to not-shown differential gears. The differential gears drive the wheels 3 through not-shown drive shafts.

Figure 2:
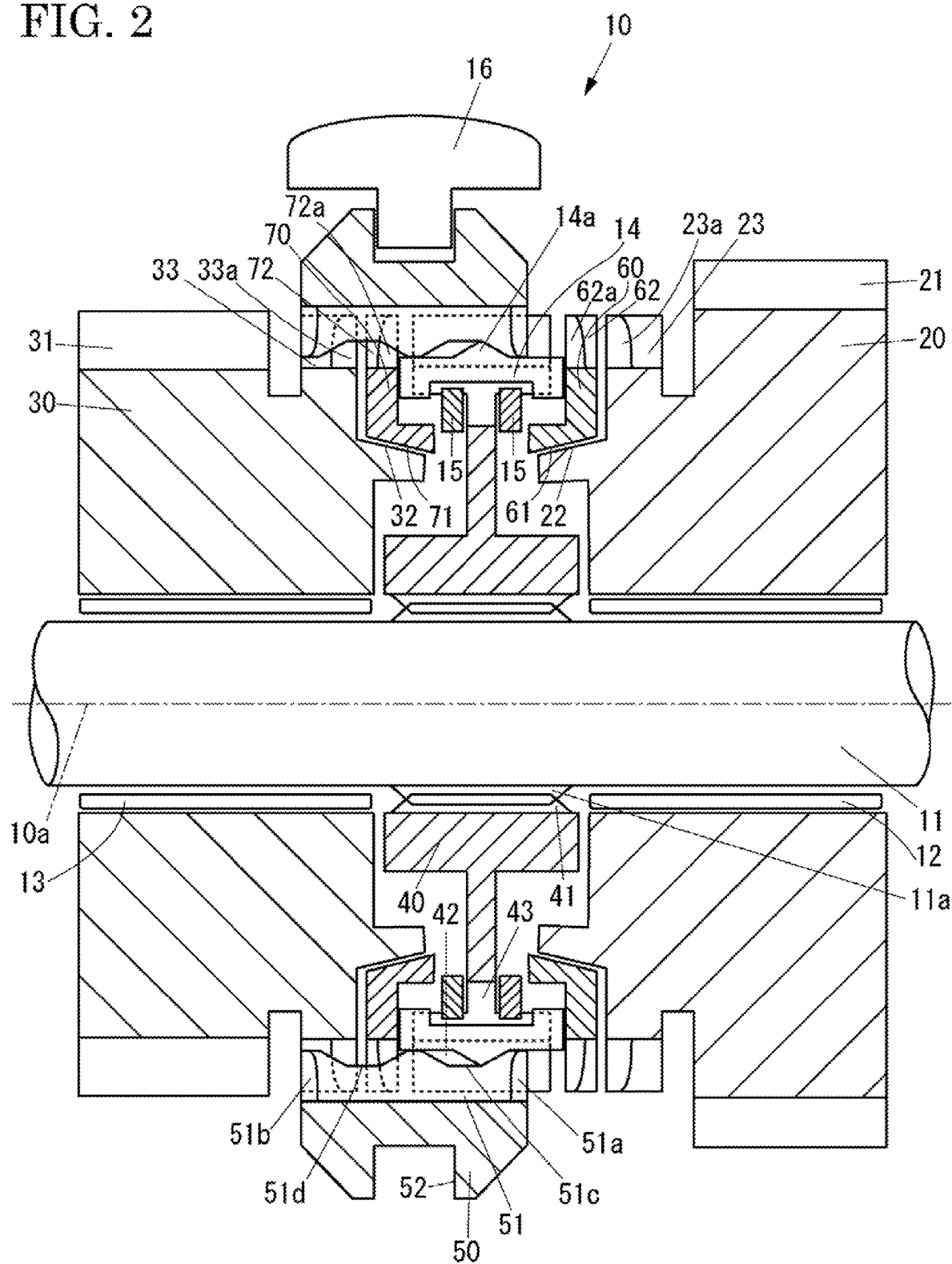
FIG. 2 is a side view showing the synchromesh mechanism of the first embodiment.
Figure 3:
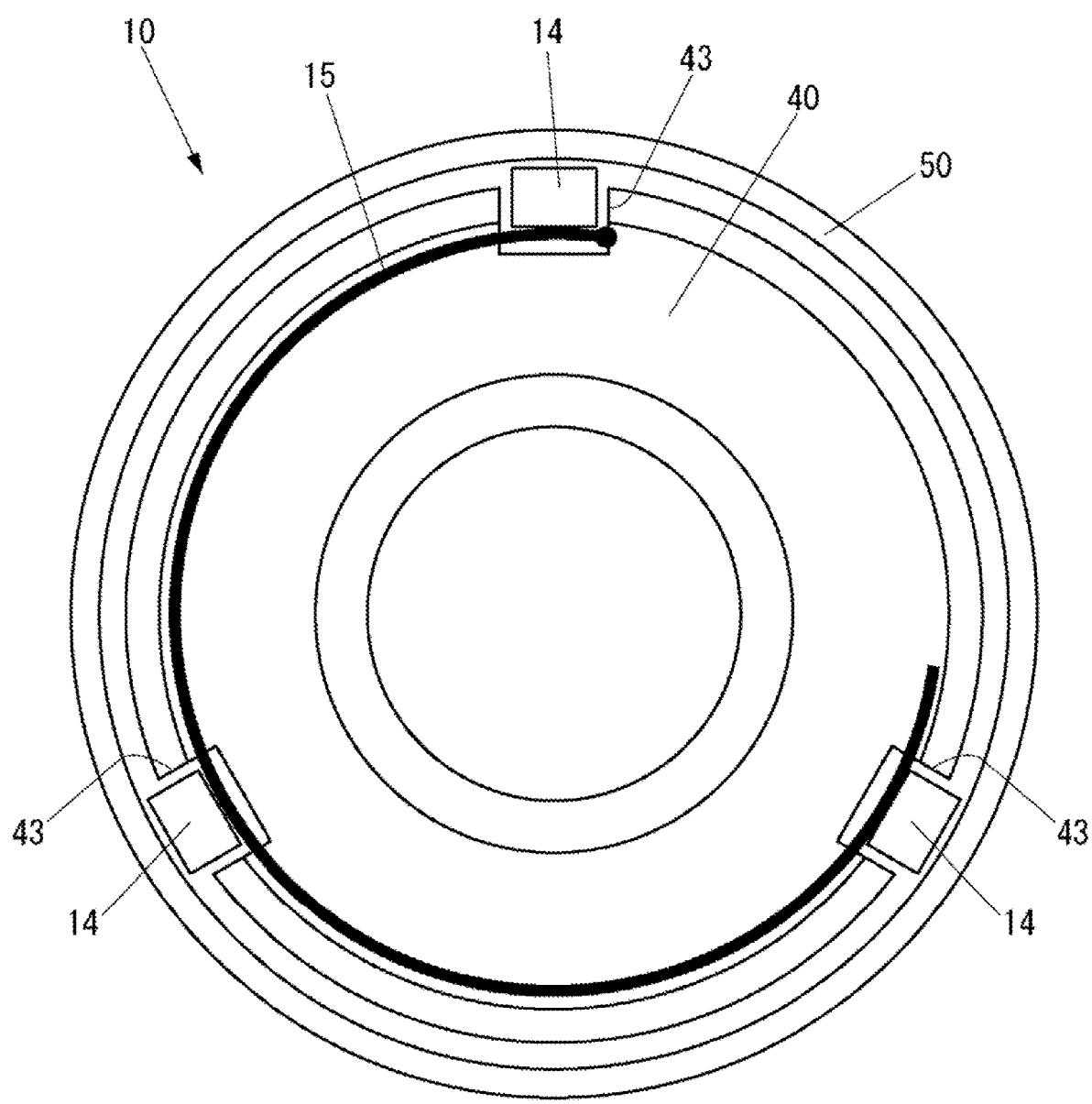
FIG. 3 is a front view showing the synchromesh mechanism of the first embodiment where some parts are removed.

FIG. 2 is a side view of the synchromesh mechanism of the first embodiment that is used for a part of the transmission 4.

As shown in FIGS. 2 to 5, the synchromesh mechanism 10 includes a shaft 11, a shift sleeve 50, a first gear 20, a second gear 30, a hub 40, a first synchronizer ring 60, a second synchronizer ring 70 and a plurality of synchronizer keys 14.

The shaft 11 transmits power from the power unit 2 to the wheels 3.

The first gear 20 is rotatable on the shaft 11 through a bearing 12, and it is formed with teeth 21 at its radially outer side. It has a first dog clutch gear 23 engageable with the shift sleeve 50 and a first cone portion 22 formed with a frictional surface at its radially outer side and projecting toward the hub 40 as one unit. The first dog clutch gear 23 is formed to have chamfers 23a at a hub 40 side.

The second gear 30 is rotatable on the shaft 11 through a bearing 13, and it is formed with teeth 31 at its radially outer side. It has a second dog clutch gear 33 engageable with the shift sleeve 50 and a second cone portion 32 formed with a frictional surface at its radially outer side and projecting toward the hub 40 as one unit. The second dog clutch gear 23 is formed to have chamfers 23c at a hub 40 side.

The hub 40 is arranged between the first gear 20 and the second gear 30. The hub 40 has three cut-off portions at equal intervals in a circumferential direction. The hub 40 is formed at its center with splines 41 on a radially inner surface, which are engaged with splines 11a of the shaft 11. A radially outer side thereof is formed with splines 42.

The shift sleeve 50 is formed with splines 51 at its inner side, and it is always engaged with the splines 42 of the hub to rotate with together the hub 40 and move in the axial direction. The splines 51 has chamfers 51a at the first gear 20 side and chamfers 51b at the second gear 30 side. The shift sleeve 50 is moved toward the first gear 20 to engage with the first dog clutch gear 23 of the first gear 20, while it is moved toward a left side to engage with the second dog clutch gear 33 of the second gear 30.

It is formed with a circumferential groove 52 at its radially outer side and its center position. A shift fork 16 is slidably inserted in the circumferential groove 52 to move the shift sleeve 50 in the axial direction.

The shift sleeve 50 is different from a prior one in the following points. The splines 51 are formed with a first circumferential groove 51c from its center position toward the right side, while they are formed with a second circumferential groove 51d from its center position toward the left side. The first circumferential groove 51c and the second circumferential groove 51d are formed in the axial direction to have slopes that extend from their deepest center portions. In addition, engagement size relationships between the shift sleeve 50 and the first dog clutch gear 23 and between the shift sleeve 50 and the second dog clutch gear 33 are different from a prior one, and a relationship between the shift sleeve 50 and the synchronizer keys 14 is also different. There is no neutral position. These explanations will be described after.

The first synchronizer ring 60 is arranged between the hub 40 and the first gear 20. The first synchronizer ring 60 is formed with a first friction surface 61 on its radially inner side, which corresponds to the first cone portion 22 of the first gear 20. Splines 62 are formed on its radially outer portion to be engageable with the splines 51 of the shift sleeve 50. The splines 62 are formed with chamfers 62a at the hub 40 side. The first synchronizer ring 60 is limited to be rotated approximately one pitch of the splines 62, for example, relative to the hub 40 in the circumferential direction because not-shown portions of the first synchronizer ring 60 are inserted into not-shown grooves of the hub 40.

The second synchronizer ring 70 is arranged between the hub 40 and the second gear 30. The second synchronizer ring 70 is formed with a second friction surface 71 on its radially inner side, which corresponds to the second cone portion 22 of the second gear 30. Splines 72 are formed on its radially outer portion to be engageable with the splines 51 of the shift sleeve 50. The splines 72 are formed with chamfers 72a at the hub 40 side. The second synchronizer ring 70 is limited to be rotated approximately one pitch of the splines 72, for example, relative to the hub 40 in the circumferential direction because not-shown portions of the second synchronizer ring 70 are inserted into not-shown grooves of the hub 40.

The synchronizer keys 14 are arranged in the cut-off portions 43 of the hub 40. They are formed with a projecting portion 14a at its center position and at a radially outer side to be selectively engaged on one of the first circumferential groove 51c and the second circumferential groove 51d. The projecting portion 14a is formed with slopes at the both sides in the axial direction.

The slanted angles of the slopes of the synchronizer keys 14, the slanted angles of the slopes of the first and second first circumferential grooves 51c and 51d, the angles of the chamfers 62a and 72a and so on are designed to set appropriately. Thus the first synchronizer ring 60 is dragged by the rotation of the first gear 20 to be positioned at a relatively rotated position where the splines 51 of the shift sleeve 50 are maintained to face to the splines 62 of the first synchronizer ring 60 to stop the further advance of the shift sleeve 50 as long as frictional torque is generated between the cone portion 22 of the first gear 20 and the friction surface 61 of the first synchronizer ring 60 due to axial directional press of the shift sleeve 50.

When they are synchronized and the frictional torque vanishes, the chamfers 51a of the shift sleeve 50, still pressed in the axial direction, pushes the chamfers 62a of the first synchronizer ring 60, so that the first synchronizer ring 60 is relatively rotated in a reverse direction. This enables the splines 51 of the shift sleeve 51 and the splines 62 of the first synchronizer ring 60 not to face to each other. Accordingly the shift sleeve 50 is permitted to advance to engage with the splines 62 of the first synchronizer ring 60 and the first dog clutch gear 23 of the first gear 20.

Similarly, in the operation from the first gear 20 toward the second gear 30, the second synchronizer ring 70 is dragged by the rotation of the second gear 30 to be positioned at a relatively rotated position where the splines 51 of the shift sleeve 50 are maintained to face to the splines 72 of the second synchronizer ring 70 to stop the further advance of the shift sleeve 50 as long as the frictional torque is generated between the cone portion 32 of the second gear 30 and the friction surface 71 of the second synchronizer ring 30 due to the axial directional press of the shift sleeve 50.

When they are synchronized and the frictional torque vanishes, the shift sleeve 50, still pressed in the axial direction, pushes the chamfers 72a of the second synchronizer ring 70, so that the second synchronizer ring 70 is relatively rotated in the reverse direction. This enables the splines 51 of the shift sleeve 51 and the splines 72 of the second synchronizer ring 70 not to face to each other. Accordingly the shift sleeve 50 is permitted to advance to engage with the splines 72 of the second synchronizer ring 70 and the second dog clutch gear 33 of the second gear 30.

The synchronizer keys 14 are always pressed in a radially outward at two positions in the axial direction by a pair of C-shaped springs 15. Incidentally, when the shaft 11 is rotated, centrifugal force acts on them, and accordingly the synchromesh mechanism is not necessary for the springs 15.

The shift sleeve 50 is designed to have a length so that it can contact with the first synchronizer ring 60 and the second synchronizer ring 70 at the same time.

The shift sleeve 50 is also designed to have a length so that it indirectly pushes the first synchronizer ring 60 through the synchronizer keys 14 to contact the first friction surface 61 of the first synchronizer ring 60 with the first cone portion 22 of the first gear 20 at least before it is disengaged from the second gear 30 in a case where it is moved toward the first gear 20 from an engagement state of the second gear 30.

The shift fork 16 is driven by a not-shown actuator controlled by a not-shown control unit to move in the axial direction. The control unit is received with signals outputted from sensors that detect rotational speed of an output shaft, an engine load and so on to calculate kinds and time of changes of the gears and control the actuator.

The operation of the synchromesh mechanism 10 of the first embodiment will be described below.

Hereinafter, the operation when the shift sleeve 50 is shifted from an engagement of the second gear 30 toward the first gear 20 will be described.

Figure 4:
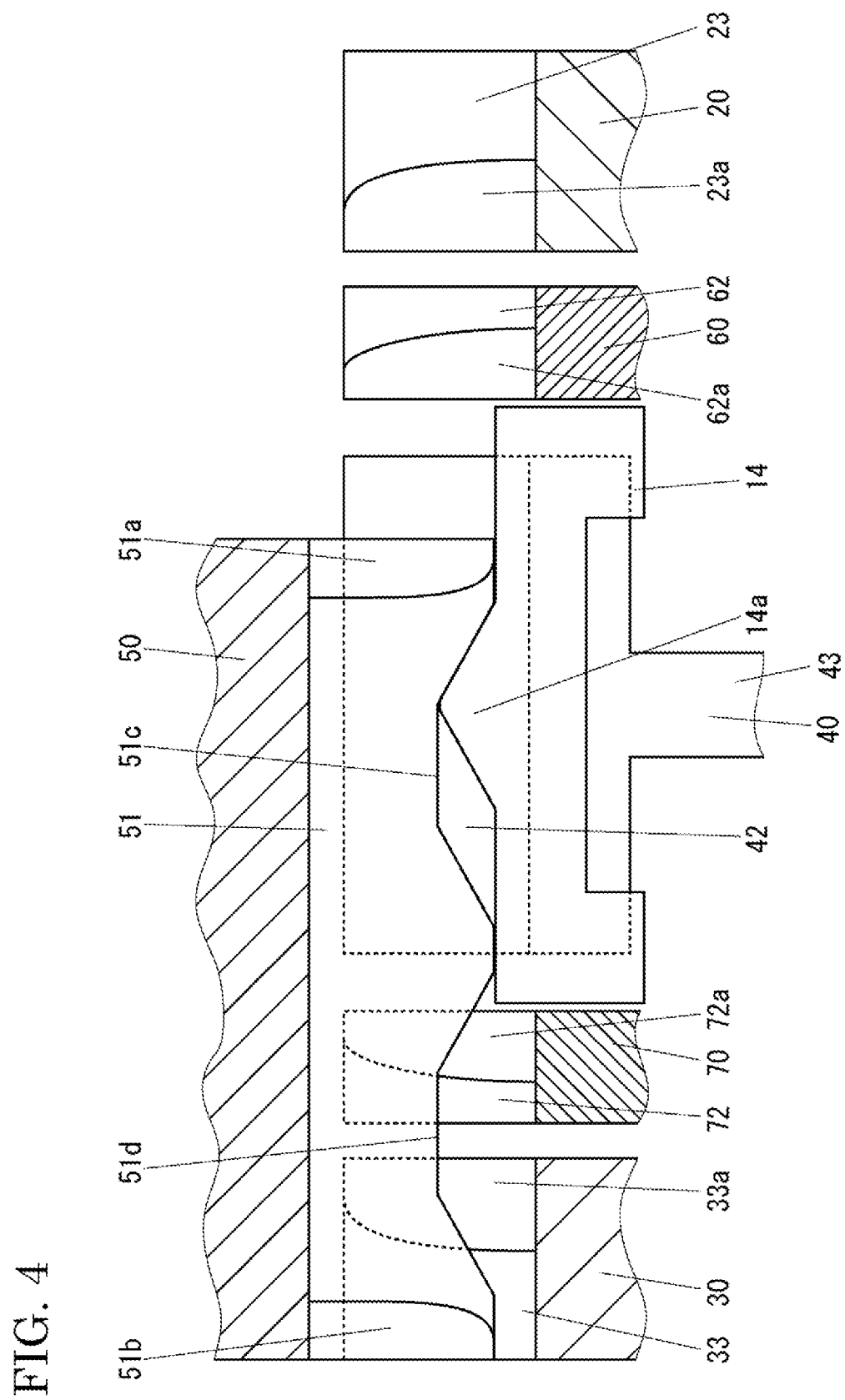
FIG. 4 is a side view showing the synchromesh mechanism of the first embodiment where a shift sleeve is engaged with a second gear.
Figure 5:
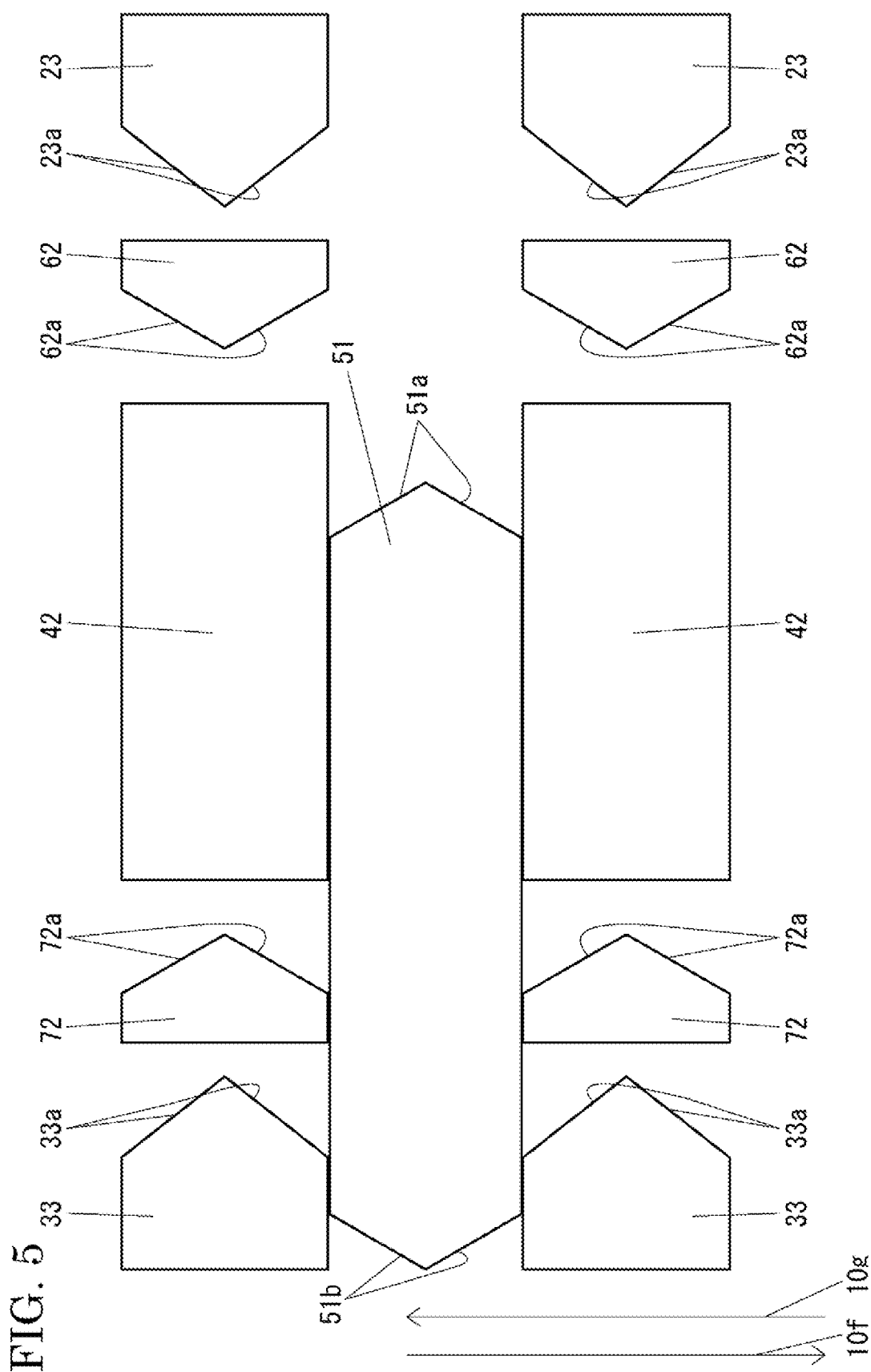
FIG. 5 is an enlarged part view showing the synchromesh mechanism of the first embodiment in a state shown in FIG. 4, seen from the above.

The synchromesh mechanism 10 is in a state where the shift sleeve 30 is engaged with the second gear 30 as FIGS. 4 and 5. That is, the splines 51 of the shift sleeve 50 are engaged with the second dog clutch gear 33 of the second gear 30, so that the shift sleeve 50 is rotated together with the second gear 30. The splines 51 of the shift sleeve 50 are also engaged with the splines 42 of the hub 40, and the splines 41 of the hub 40 are engaged with the splines 11a of the shaft 11. Therefore the shaft 11 rotates together with the second gear 30.

Hereinafter, the second gear 30 rotates in a first rotational direction shown as an arrow 10f in FIG. 5. Let the first gear 20 rotate at lower speed than the second gear 30, and then the splines 51 of the shift sleeve 50 is pressed in the first rotational direction by the second dog clutch gear 33 rotating in a second rotational direction, shown as an arrow 10g, opposite to the first rotational direction 10f. Thus the splines 42 of the hub 40 are pressed in the first rotational direction 10f. In this state, the right slope of the first circumferential groove 51c is positioned to contact the right slopes of the projecting portions 14a of the synchronizer keys 14.

When the shift fork 16 is started to move toward the first gear 20 according to the operation of the actuator, the shift sleeve 50 is started to move in the same direction because of the slidable insertion of fork 16 and the circumferential groove 52 of the shift sleeve 50.

The synchronizer keys 14 are pressed to move toward the first gear 10 to contact with the first synchronizer ring 60. That is, the shift sleeve 50 indirectly pushes the first synchronizer ring 60 toward the first gear 20. Then the first synchronizer ring 60 is moved toward the first gear 20 to contact its first friction surface 61 with the first cone portion 22 of the first gear 20. The synchromesh mechanism 10 becomes a state shown in FIGS. 6(a) and 6(b). In this state, the left slope of the first circumferential groove 51c of the shift sleeve 50 contacts with the left slopes of the projecting portions 14a of the synchronizer keys 14.

Figure 6:
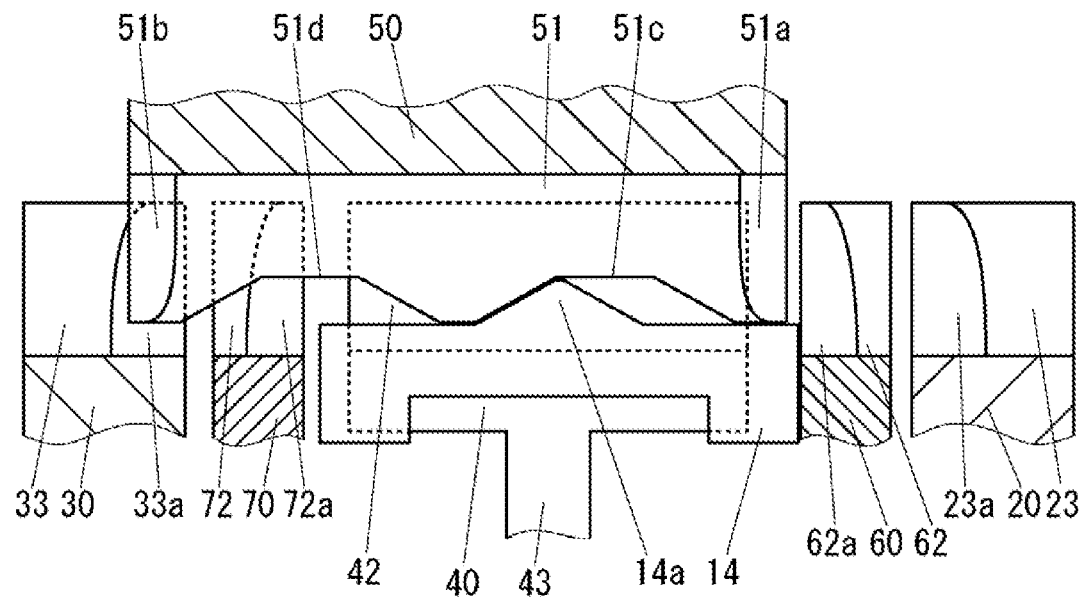
FIG. 6(a) is a side view showing the synchromesh mechanism of the first embodiment where synchronizer keys push a first synchronizer ring to push a frictional surface of the first synchronizer ring to a cone portion of a gear.
FIG. 6(b) is a part view showing the synchromesh mechanism shown in FIG. 6(a), seen from the above.
Figure 6B:
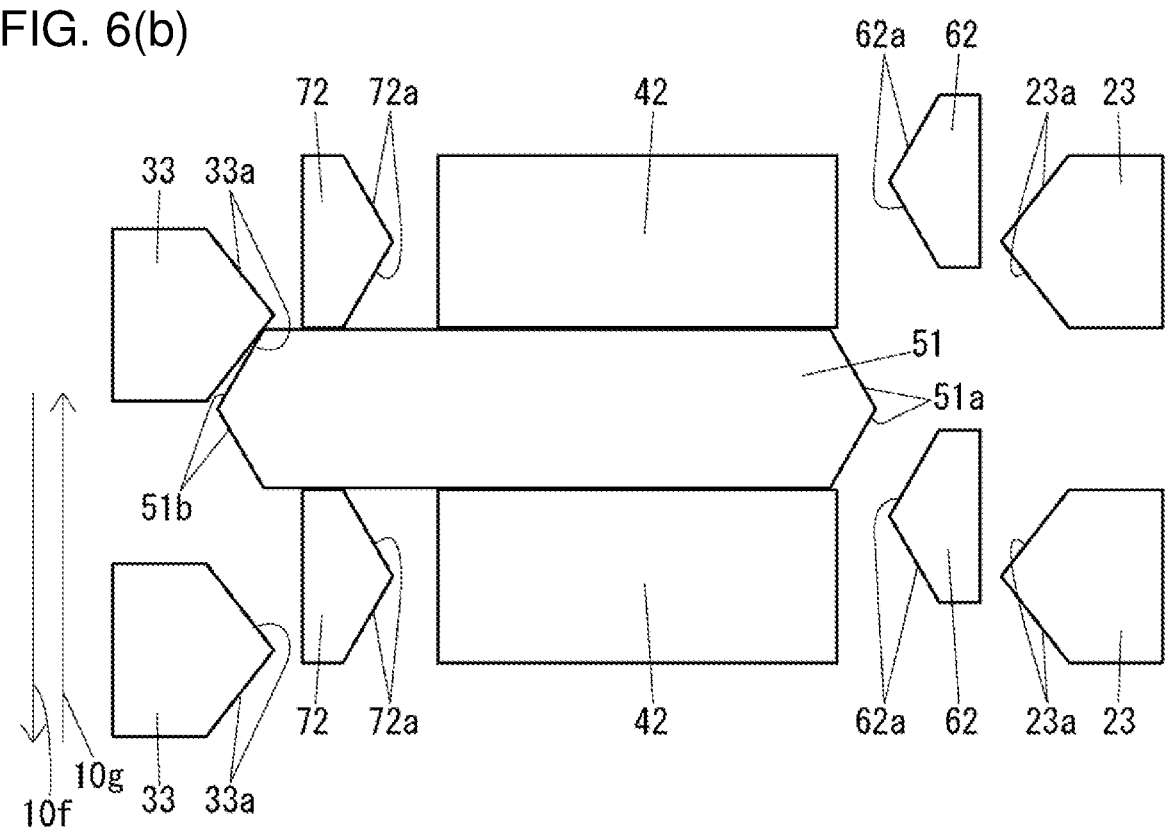

FIG. 6(a) shows a side view of a part of the synchromesh mechanism 10 in a state where the friction surface 61 of the first synchronizer ring 60 contacts with the first cone portion 22 of the first gear 20 because the first synchronizer ring 60 is pressed by the synchronizer keys 14. FIG. 6(b) shows a view of the part of the synchromesh mechanism 10 seen from the above.

The hub 40 rotates together with the second gear 30 in the first rotational direction 10f. The first gear 20 rotates in the same rotational direction but it is slower than the second gear 30, so that it rotates in the second rotational direction 10g relative to the hub 40. Thus the first synchronizer ring 60 rotates in the second rotational direction 10g relative to the hub 40 due to the frictional torque in the second rotational direction 10g caused between the first friction surface 61 of the first synchronizer ring 60 and the first cone portion 22 of the first gear 20. The first synchronizer ring 60 is held at an end portion in the second rotational direction 10g as shown in FIG. 6(b) within rotatable angles in the circumferential direction relative to the hub 40.

That is, the first synchronizer ring 60 holds in a state where it is rotated approximately half pitch of the splines 62 in the second rotational direction 10g relative to the engagement position of the splines 62 of the synchronizer ring 60 and the splines 51 of the shift sleeve 50. In this state, the splines 51 of the shift sleeve 50 contact with the chamfers 33a of the first dog clutch gear 33 of the second gear 30, and they are engaged with the splines 72 of the second synchronizer ring 70, being not engaged with the splines 62 of the first synchronizer ring 60 and the first dog clutch gear 23 of the first gear 20.

Incidentally, in the state of FIGS. 6(a) and 6(b), the second dog clutch gear 33 of the third gear 30 contacts with the chamfers 51b of the splines 51 of the shift sleeve 50, so that the shift sleeve 50 is pushed toward the first gear 20 by the second gear 30 according to the rotation of the second gear 30 in the first rotational direction 10f relative to the shift sleeve 50. Thus, the shift sleeve 50 pushes the synchronizer keys 14 through the slope of the shift sleeve 50 and the projecting portions 14a of the shift sleeve 14, the synchronizer keys 14 contact with the first synchronizer ring 60, and so the first friction surface 61 of the first synchronizer ring 60 is pressed against the first cone portion 22 of the first gear 20 by the shift sleeve 50 to start to generate the frictional torque, so that the rotation synchronization of the first synchronizer ring 60 and the first gear 20 is started.

Figure 7A:
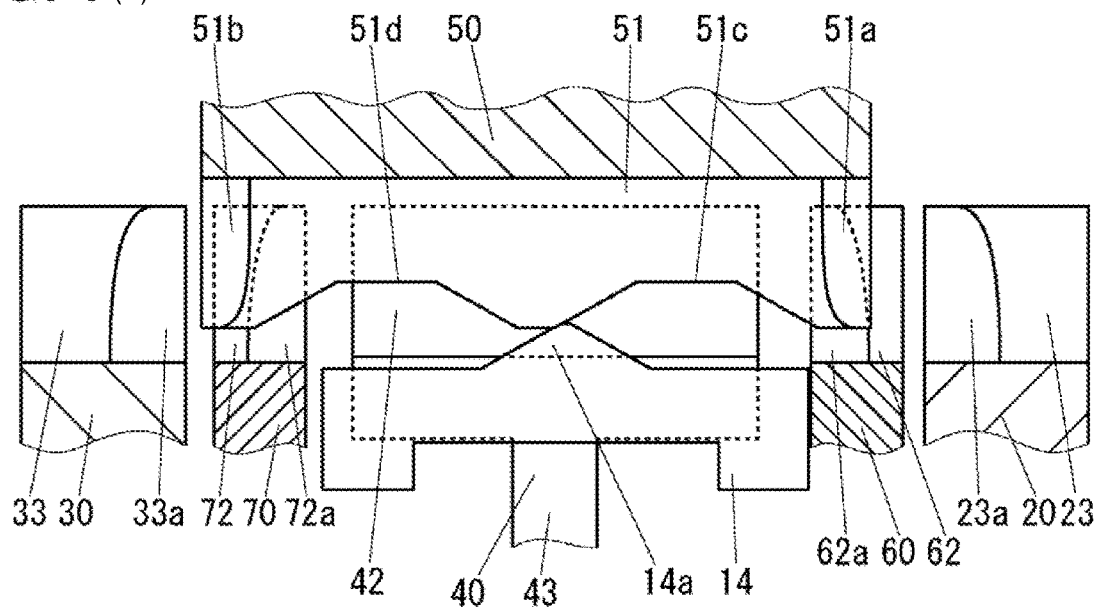
FIG. 7(a) is a side view showing the synchromesh mechanism of the first embodiment where the shift sleeve pushes the synchronizer ring to contact its frictional surface to the cone portion of the gear.
Figure 7B:
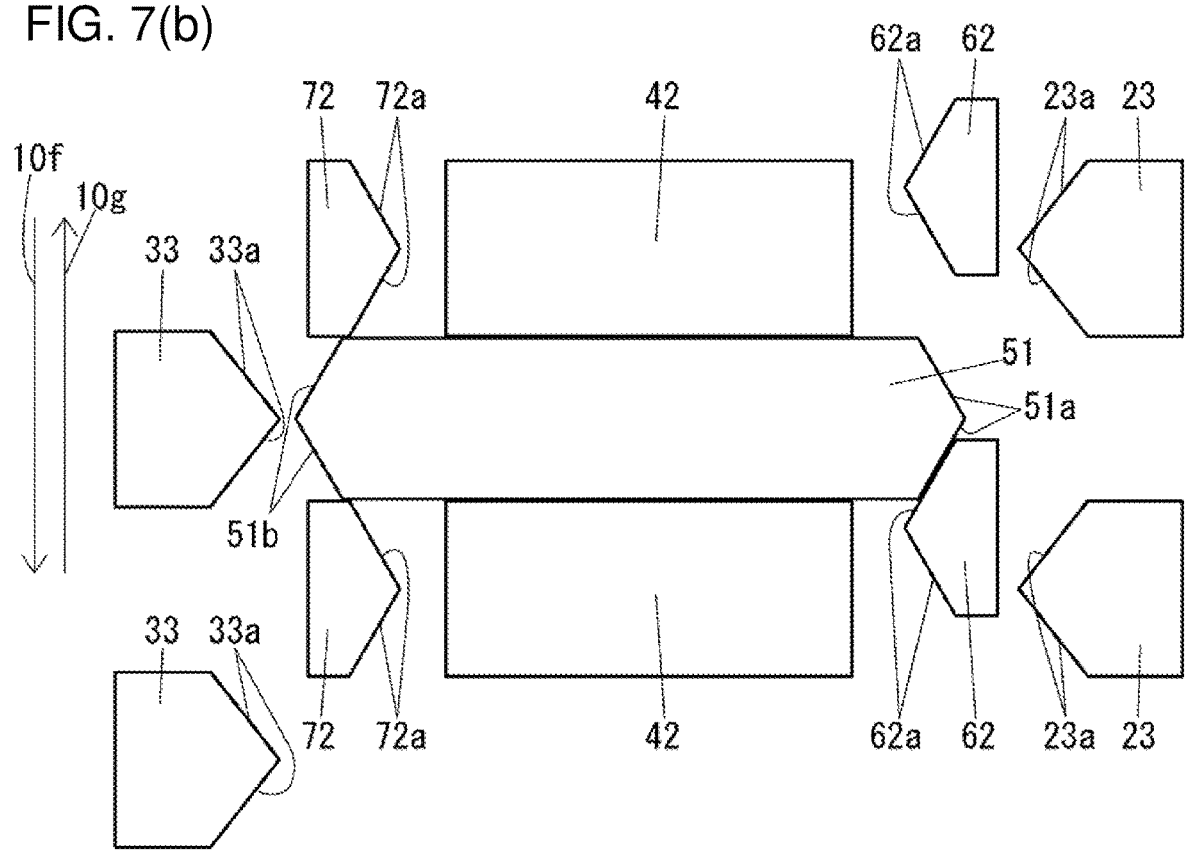
FIG. 7(b) is a part view showing the synchromesh mechanism shown in FIG. 7(a), seen from the above.

When shift sleeve 50 is further moved toward the first gear 20 from the state of FIGS. 6(a) and 6(b), the left slopes of the projecting portions 14a of the synchronizer keys 14 further move toward the right side, being engaged with the left slopes of the first circumferential groove 51c of the shift sleeve 50, and a part of the projecting portions 14a being got out of the first circumferential groove 51c as shown in FIGS. 7(a) and 7(b). In this state, the chamfers 51a of the splines 51 of the shift sleeve 50 contact with the chamfers 62a of the splines 62 of the first synchronizer ring 60.

FIG. 7(a) shows a side view of the part of the synchromesh mechanism 10 in a state where the friction surface 61 of the first synchronizer ring 60 strongly contact with the first cone portion 22 of the second gear 20 by the shift sleeve 50 pressing the first synchronizer ring 60. FIG. 7(b) shows a view of the part of the synchromesh mechanism 10 seen from the above.

As shown in FIGS. 7(a) and 7(b), the chamfers 51a of the splines 51 of the shift sleeve 50 contact with the chamfers 62a of the splines 62 of the first synchronizer ring 60, the chamfers 51b of the splines 51 of the shift sleeve 50 contact the chamfers 72a of the splines 72 of the second synchronizer ring (70), and so the first friction surface 61 of the first synchronizer ring 60 and the first cone portion 22 of the first gear 20 are strongly pressed against each other by the shift sleeve 50 pressing the first synchronizer ring 60 to increase the frictional torque therebetween. Therefore, the rotation synchronization of the first synchronizer ring 60 and the first gear 20 is facilitated.

When the rotational synchronization of the first synchronizer ring 60 and the second gear 20 is ended, the first synchronizer ring 60 does not receive the frictional torque in the second rotational direction 10g from the first cone portion 22 of the second gear 20. This enables the chamfers 51a of the splines 51 of the shift sleeve 50 to advance and rotate the chamfers 62a of the splines 62 of the first synchronizer 60 in the first rotational direction 10f relative to the shift sleeve 50. This is a state of FIGS. 8(a) and 8(b). In this state, the shift sleeve 50 further moves to engage its splines 51 with the splines 62 of the first synchronizer ring 60.

Figure 8A:
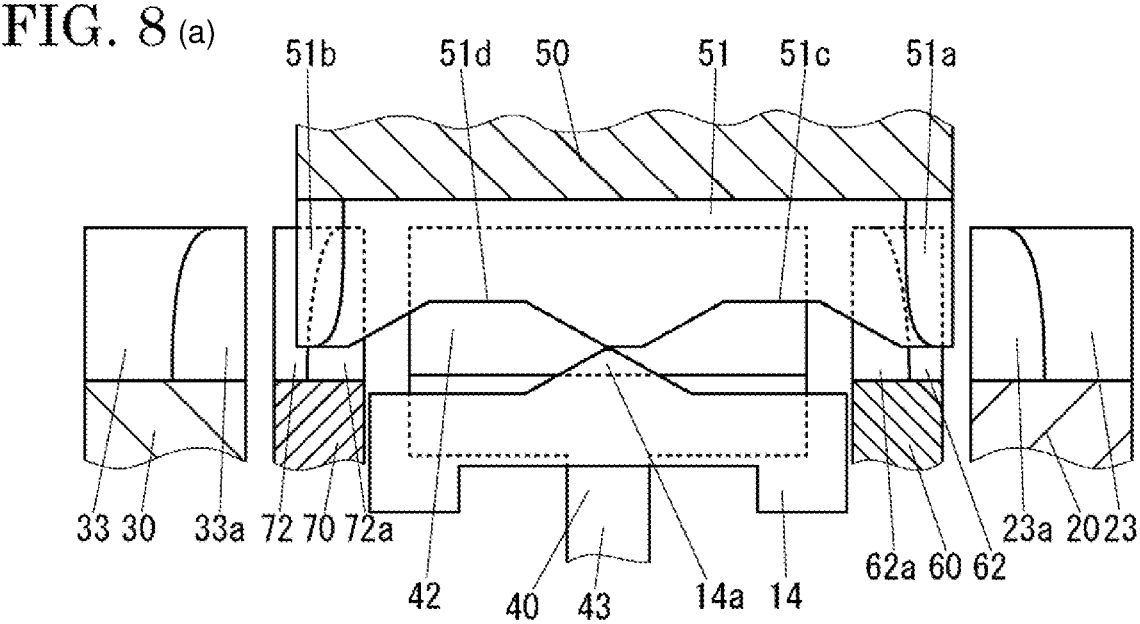
FIG. 8(a) is a side view showing the synchromesh mechanism of the first embodiment where the synchronizer ring and the gear are synchronized.
Figure 8B:
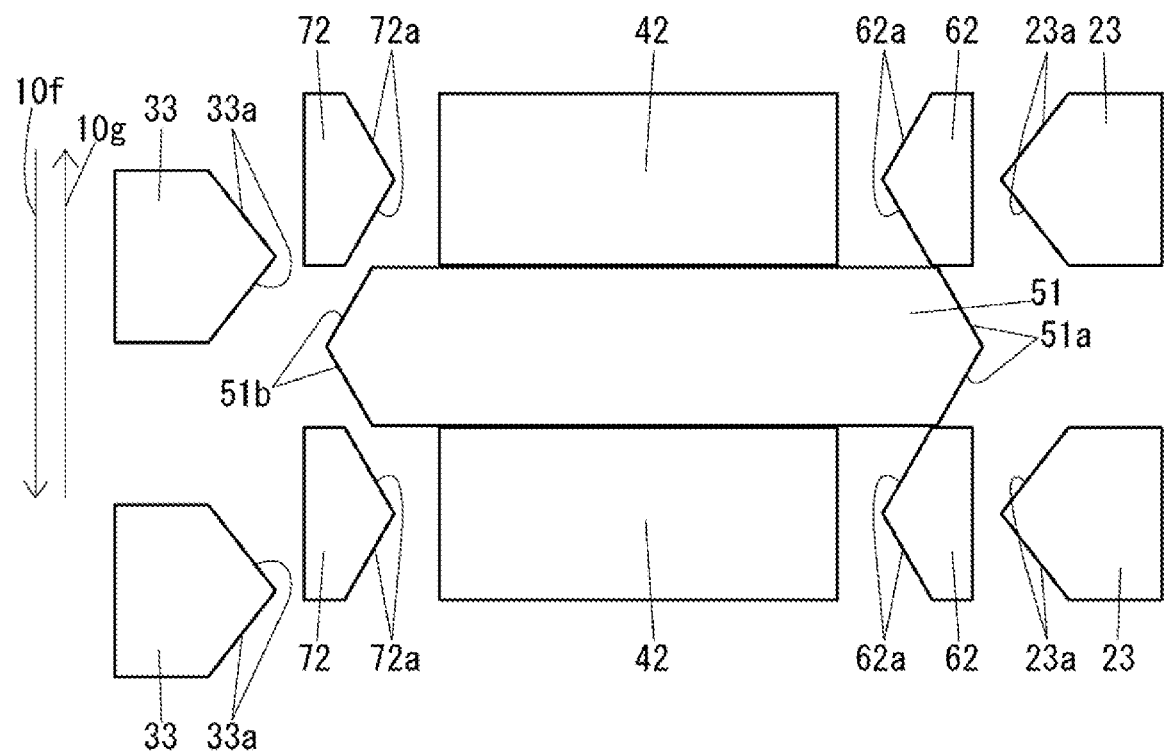
FIG. 8(b) is a part view showing the synchromesh mechanism shown in FIG. 8(a), seen from the above.

FIG. 8(a) shows a side view of the part of the synchromesh mechanism 10 where the rotation synchronization 10 of the first synchronizer ring 60 and the first gear 20 is completed. FIG. 8(b) shows a view of the part of the synchromesh mechanism 10 seen from the above.

As shown in FIGS. 8(a) and 8(b), the projecting portions 14a of the synchronizer keys 14 are got out from the first circumferential groove 51c of the shift sleeve 51. That is, the right slopes of the projecting portions 14c of the synchronizer keys 14 contact with the right slopes of the second circumferential groove 51d. When the shift sleeve 50 is further moved toward the first gear 20 from the state of FIGS. 8(a) and 8(b), the chamfers 51a of the splines 51 of the shift sleeve 50 contact with the chamfers 23a of the first dog clutch gear 23 of the first gear 20. The shift sleeve 50 and the first gear 20 are relatively rotated in the circumferential direction, and the chamfers 51a and the chamfers 23a do not contact with each other. Then the shift sleeve 50 is further moved toward the first gear 20. Therefore, the splines 51 of the shift sleeve 50 contact with the first dog clutch gear 23 of the first gear 20 as shown in FIGS. 9(a) and 9(b).

Figure 9:
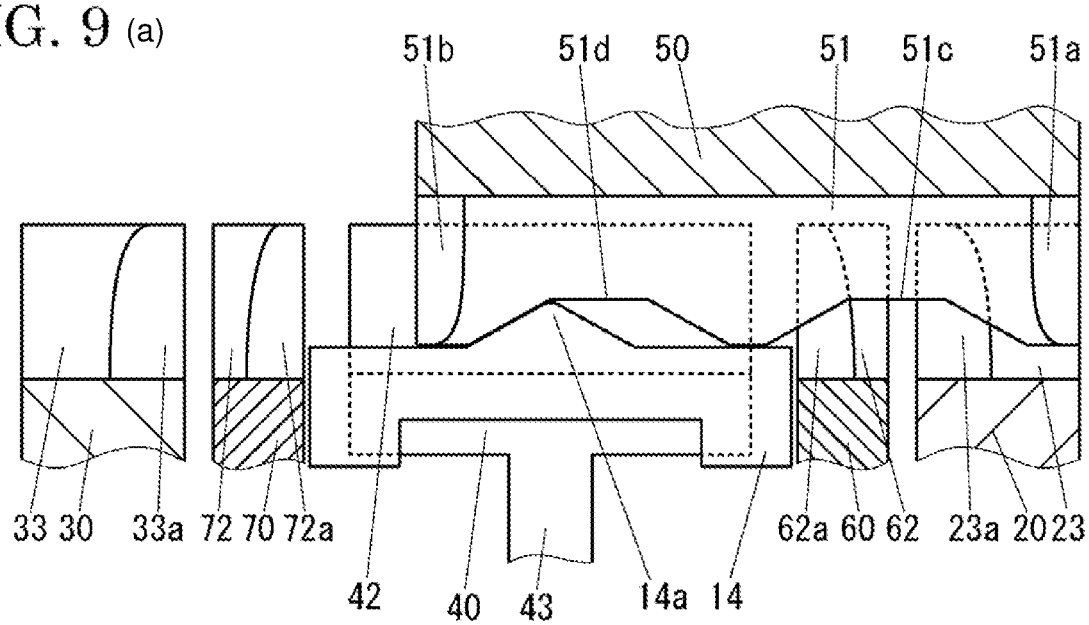
FIG. 9(a) is a side view of the synchromesh mechanism of the first embodiment where the shift sleeve is engaged with the first gear.
FIG. 9(b) is a part view showing the synchromesh mechanism shown in FIG. 9(a), seen from the above.

FIG. 9(a) shows a side view of the part of the synchromesh mechanism 10 in a state where the shift sleeve 50 is engaged with the first gear 20. FIG. 9(b) shows a view of the part of the synchromesh mechanism 10 seen from the above.

Figure 9B:
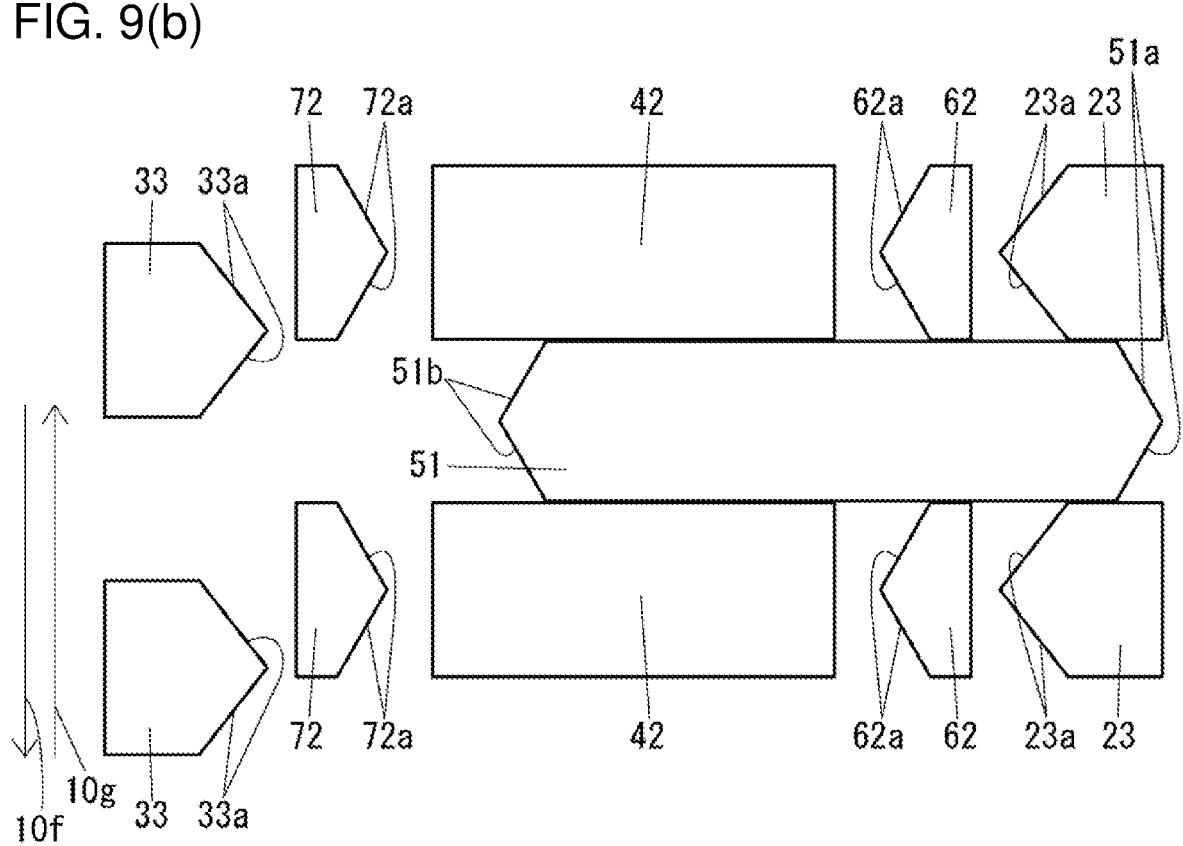

FIGS. 9(a) and 9(b) are the views showing the state where the gear shift is completed. The shift sleeve 50 rotes together with the first gear 20 because of the engagement of the splines 51 of the shift sleeve 50 and the dog clutch gear 23 of the first gear 20. Therefore, the shaft 11 rotes together with the first gear 20 as the splines 51 of the shift sleeve 50 are engaged with the splines 42 of the hub 40 and the splines 41 of the splines 41 of the hub 40 are engaged with the splines 11a of the shaft 11.

Incidentally, the left slopes of the projecting portions 14a of the synchronizer keys 14 contact with the left slope of the second circumferential groove 51d of the shift sleeve 50.

As the first gear 20 rotates in the first rotational direction 10f, the splines 51 of the shift sleeve 50 are pushed in the first rotational direction 10f by the first dog clutch gear 23 relatively rotating in the second rotational direction 10g, and the splines 42 of the hub 40 relatively rotating in the first rotational direction 10f are pushed in the first rotational direction 10f.

The operation when the shift sleeve 50 is shifted toward the second gear 30 from the engagement state of the first gear 20 is similar to that of the above-described operation. The operational directions are opposite to this operation.

The synchronizer ring 60 and 70 may be constructed to directly pushed by the shift sleeve 50.

As described from the above, the synchromesh mechanism 10 of the first embodiment has the following advantages.

The synchromesh mechanism 10 can suppress cutting off of the power when the shift sleeve 50 is shifted from one gear toward the other gear and suppress a driver's feeling of free running of the motor vehicle.

The shift sleeve 50 is designed to have the length so that it can contact with the first synchronizer ring 60 and the second synchronizer ring 70 at the same time. So when the first gear 20 is shifted to the second gear 30, after the shift sleeve 50 is disengaged from the first gear 20, time when the second synchronizer ring 70 is directly or indirectly pushed so that the friction surface 71 can contact with the cone portion 32 to generate the frictional torque can be shorter than prior ones. An oppositional directional operation is similar to the above-described operation. Therefore, the synchromesh mechanism 10 can suppress cutting off of the power when the shift sleeve 50 is shifted from the one gear toward the other gear and suppress a driver's feeling of free running of the motor vehicle.

The shift sleeve 50 is designed to have the length so that it can indirectly push the first synchronizer ring 60 through the synchronizer keys 14 to contact the first friction surface 61 of the first synchronizer ring 60 with the first cone portion 22 of the first gear 20 at least before it is disengaged from the second gear 30 in a case where it is moved toward the first gear 20 from an engagement state of the second gear 30. An oppositional directional operation is similar to the above-described operation. Therefore, the synchromesh mechanism 10 can suppress cutting off of power when the shift sleeve 50 is shifted from the one gear toward the other gear and suppress a driver's feeling of free running of the motor vehicle.

The shift sleeve 50 is designed to have the maximum length so that the contact of the second gear 30 and the contact of the first synchronizer ring 60 can cause only at the different time in the case where the shift sleeve 50 is shifted toward the first gear 20 from the engagement state of the second gear 30. Similarly, the second synchronizer ring 70 can accomplish the same operation. Therefore, the synchromesh mechanism 10 can suppress cutting off of the power when the shift sleeve 50 is shifted from the one gear toward the other gear and suppress a driver's feeling of free running of the motor vehicle.

Incidentally, as long as the shift sleeve 50 has the length so that the contact of the second gear 30 and the contact of the synchronizer ring 60 can cause at the different time when the it is shifted toward the first gear 20 from the engagement state of the second gear 30, the maximum length is not necessary. Similarly, the second synchronizer ring 70 can accomplish the same operation. Therefore, the synchromesh mechanism 10 can suppress cutting off of power when the shift sleeve 50 is shifted from the one gear toward the other gear and suppress a driver's feeling of free running of the motor vehicle.

The chamfers 33a of the second gear 30 contact with the shift sleeve 50 to push the shift sleeve 50 against the first gear 20 due to the relative rotation of the second gear 30 and the shift sleeve 50 when the shift sleeve 50 is shifted toward the first gear 20. Thus the shift sleeve 50 indirectly pushes the first synchronizer ring 60 through the synchronizer keys 14. The operation when the shift sleeve 50 is shifted toward the second gear 30 is similar to that when it is shifted toward the first gear 20. Therefore, operating force to contact the friction surface 71 to the cone portion 32 can be decreased. An oppositional directional operation is similar to the above-described operation.

Next, a transmission of a second embodiment according to the present invention will be described below.

Figure 10:
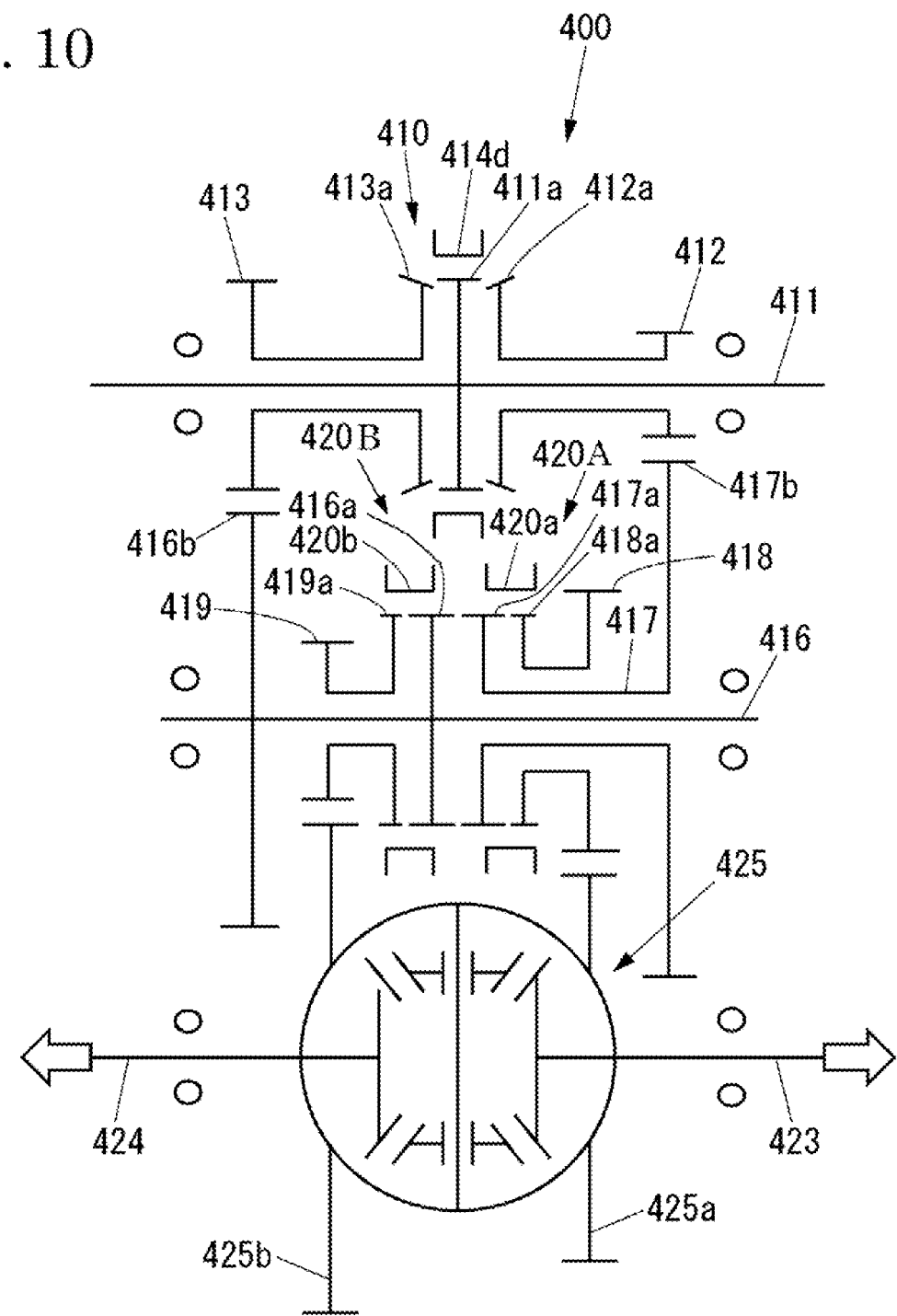
FIG. 10 is a block diagram showing a transmission with the synchromesh mechanism shown in FIG. 2 of a second embodiment according to the present invention.
Figure 12:
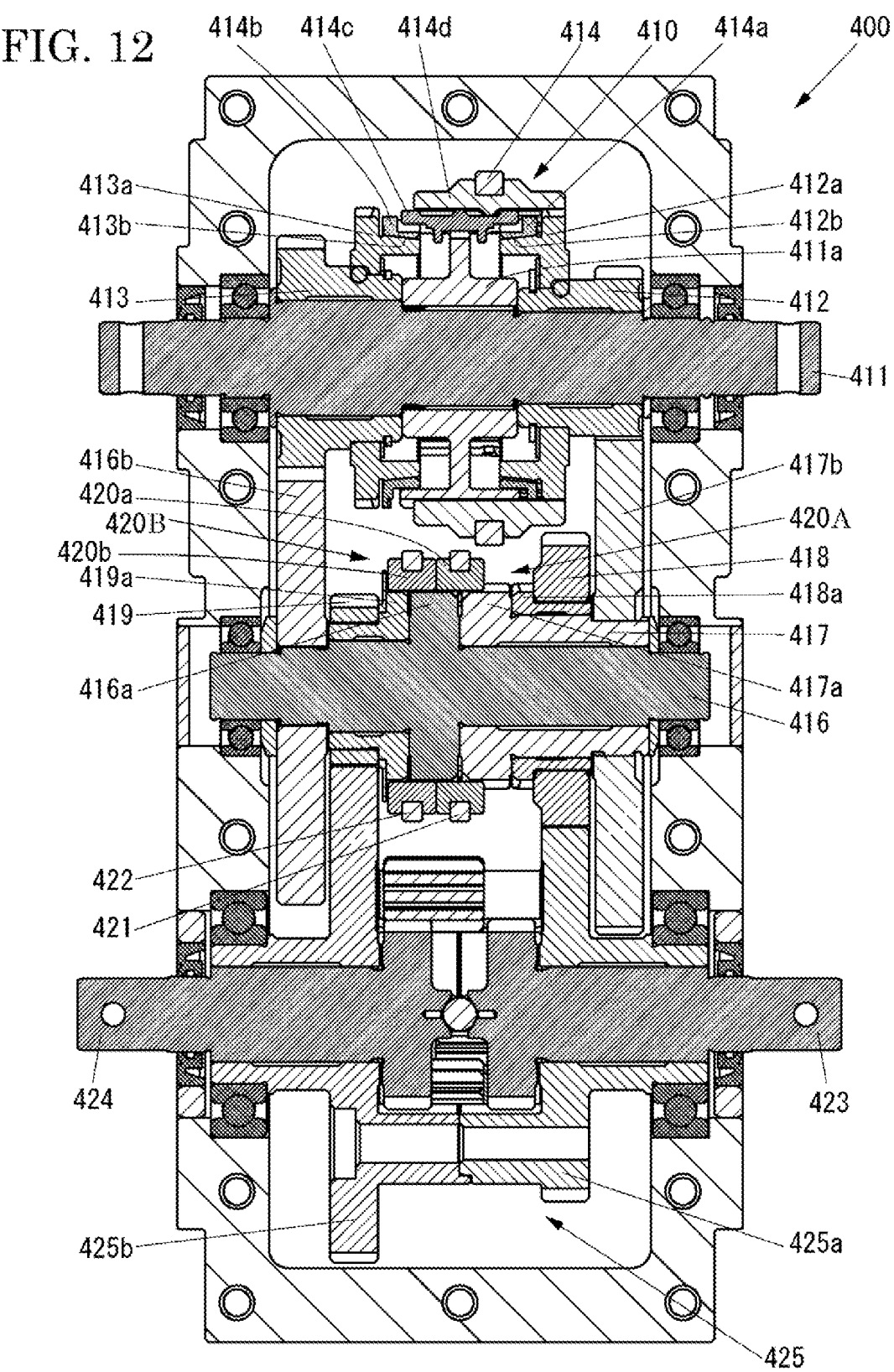
FIG. 12 is a cross-sectional side view showing the FF 4-speed parallel axis type transmission shown in FIG. 11 at first speed.

As shown in FIGS. 10 and 12, the transmission 400 has a synchromesh mechanism 410, the gear pairs and others.

An input shaft 411 is connected with electric motors/generators at the both sides. The input shaft 411 is integrally formed with a hub 411a at its center position, and a radially outer portion of the hub 411a is formed with splines.

A first-third drive gear 412 is integrally formed with a dog clutch gear 412a, and they are freely rotatable on the input shaft 411. The dog clutch gear 411a is formed with a cone portion 412b projecting toward the hub 411a. A synchronizer ring 414a is arranged among the hub 411a, the dog clutch gear 412a and the cone portion 412b.

A second-fourth drive gear 413 is integrally formed with a dog clutch gear 413a, and they are freely rotatable on the input shaft 411. The dog clutch gear 413a is formed with a cone portion 413b projecting toward the hub 411a. A synchronizer ring 414b is arranged among the hub 411a, the dog clutch gear 413a and the cone portion 413b.

A plurality of synchronizer keys 414c are arranged among the synchronizer ring 414a, the synchronizer ring 414b and a path shift sleeve 414d.

The path shift sleeve 414d is formed at its radially outer side with a circumferential groove, which receives a shift fork 414. It has a projecting portion extending in a radially inner direction. The synchronizer keys 414c are formed in an axial direction with two circumferential grooves, one of which is engaged with the projecting portion of the path shift sleeve 414d.

The path shift sleeve 414d is formed with splines on its inner surface, ant it is always engaged with the hub portion 411a. The path shift sleeve is selectively engageable with one of the dog clutch gears 412a and 413a, being selectively not engageable with the dog clutch gears 412a and 413a. The path shift sleeve 414d, the hub 411a, the dog clutch gears 412a and 413a, the synchronizer rings 412b and 413b and the cone portions 412b and 413b correspond to the synchromesh mechanism 410 of the first embodiment although a relationship between the shift sleeve 414d and the synchronizer keys 414c are opposite.

Incidentally, the path shift sleeve 414d is designed to have a length so that it can contact with the synchronizer 412b and the synchronizer ring 413b at the same time. Accordingly, when the path shift sleeve 414d is shifted from the dog clutch gear 412a to the dog clutch gear 413a, a transmission 4 can decrease time when the path shift sleeve 414d is disengaged from the dog clutch gear 412a and then the path shift sleeve 414d directly or indirectly pushes the synchronizer ring 413b against the cone portion 413b of the dog clutch gear 413a to contact and generate frictional torque.

Similarly, when the path shift sleeve 414d is shifted from the dog clutch gear 413a to the dog clutch gear 412a, the transmission 4 can decrease time when the path shift sleeve 414d is disengaged from the dog clutch gear 413a and then the path shift sleeve 414d directly or indirectly pushes the synchronizer ring 412b against the cone portion 412b of the dog clutch gear 412a to contact and generate frictional torque.

Therefore, the transmission 400 can suppress cutting off of power when the path shifting part 410 is shifted, so that a driver cannot feel free running of the motor vehicle.

In addition, the path shift sleeve 414d is designed to have a length so that, when it is shifted from the engaging state of the dog clutch gear 412a toward the dog clutch gear 413a, it can push the synchronizer ring 414b indirectly through the insert keys 414c, at least before the path shift sleeve 414d is disengaged from the dog clutch gear 412a, to contact the synchronizer ring 414b with the cone portion 413b of the dog clutch gear 413a.

It is also designed to have the length so that, when it is shifted from the engaging state of the dog clutch gear 413a toward the dog clutch gear 412a, it can push the synchronizer ring 414a indirectly through the synchronizer keys 414c, at least before the path shift sleeve 414d is disengaged from the dog clutch gear 413a, to contact the synchronizer ring 414a with the cone portion 412b of the dog clutch gear 412a.

Therefore, the transmission 400 can suppress cutting off of power when the path shifting part 410 is shifted, so that a driver cannot feel free running of the motor vehicle.

Further, the path shift sleeve 414d is designed to have a maximum length so that the contact of the dog clutch gear 412a and the contact of the synchronizer ring 414b can cause at different time in a case where it is moved from the engaging state of the dog clutch gear 412a toward the dog clutch gear 413a. Similarly, it has the maximum length so that the contact of the dog clutch gear 413a and the contact of the synchronizer ring 414a can cause at different time in a case where it is moved from the engaging state of the dog clutch gear 413a toward the dog clutch gear 412a.

Due to this construction, in a case where the path shift sleeve 414d is shifted from the engaging state of the dog clutch gear 412a toward the dog clutch gear 413a, it directly pushes the synchronizer ring 414b to contact with the cone portion 413b of the dog clutch gear 413a and generate the frictional torque therebetween immediately after the path shift sleeve 414d is disengaged from the dog clutch gear 412a.

Similarly, in a case where the path shift sleeve 414d is shifted from the engaging state of the dog clutch gear 413a toward dog clutch gear 412a, it directly pushes the synchronizer ring 414a to contact the cone portion 413b of the dog clutch gear 412a and generate the frictional torque therebetween immediately after the path shift sleeve 414d is disengaged from the dog clutch gear 413a.

Therefore, the transmission 400 can suppress cutting of power when the path shifting part is shifted, so that a driver cannot feel free running of the motor vehicle.

A counter shaft 416 is arranged parallel to the input shaft 411. A first-third driven gear 417b is engaged with the first-third drive gear 412, and a second-fourth driven gear 416b is engaged with the second-fourth drive gear 413. The first-third driven gear 417b is integrally formed with a dog clutch gear 417a and a sub-shaft 417, and they are freely rotatable on the counter shaft 416. A second-fourth driven gear 416b is integrally formed with the counter shaft 416. The counter shaft 416 has a hub portion 416a as one unit, and its radially outer side is formed with splines.

A first-second drive gear 419 is integrally formed with a dog clutch gear 419a, and they are freely rotatable on the counter shaft 416. A third-fourth drive gear 418 is integrally formed with a dog clutch gear 418a, and they are freely rotatable on the sub-shaft 417.

A first-second driven gear 425b is engaged with the first-second drive gear 419, and a third-fourth driven gear 425a is engaged with the third-fourth drive gear 418. The first-second driven gear 425b and the third-fourth driven gear 425a are connected with differential gears 425, which are connected with a right drive shaft 423 and a left drive shaft 424.

A first shift sleeve 420a is formed at its radially outer side with a circumferential groove, which receives a shift fork 421, It is engageable with the hub portion 416a, a dog clutch gear 417a and a dog clutch gear 418a, so that it is selectively engageable with the hub portion 416a and the dog clutch gear 4217a, or being selectively engageable with the dog clutch gear 417a and the dog clutch gear 418a. The first sleeve 220a, the hub portion 216a, the dog clutch gear 217a and the dog clutch gear 218a correspond to a first gear shifting part 220A.

A second shift sleeve 420b is formed at its radially outer side with a circumferential groove, which receives a shift fork 422. It is always engaged with the hub portion 416a, and it is selectively engageable with the dog clutch gear 419a, being selectively the hub portion 416a and the dog clutch gear 417a. The second shift sleeve 420b, the hub portion 416a and the dog clutch gear 419a correspond to a second gear shifting part 220B.

Figure 11:
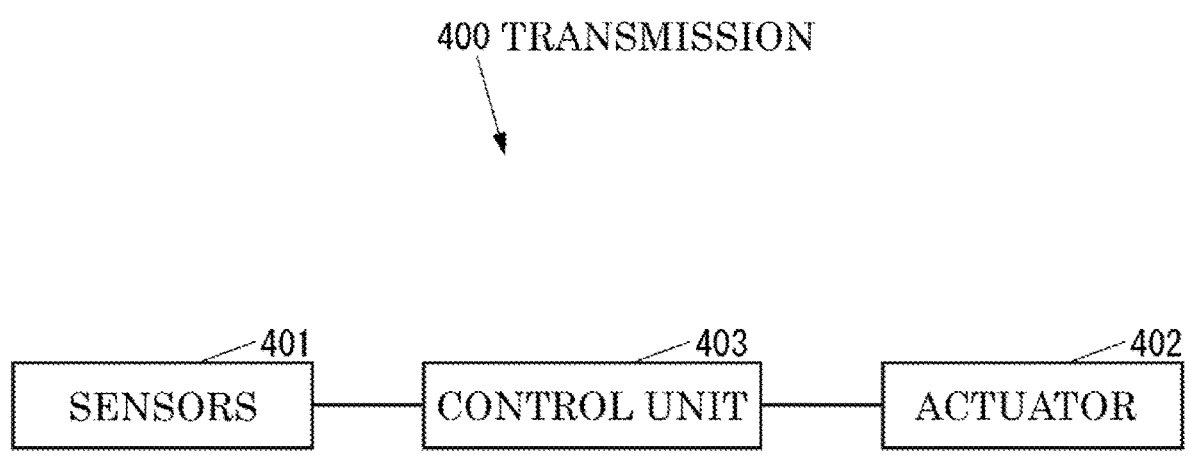
FIG. 11 is a schematic view showing an FF 4-speed parallel axis type transmission of the second embodiment.

FIG. 11 shows a control system of the transmission 400. Sensors 401 are detecting information on vehicle speed, an engine load and so on. It is sent to a control unit 403 to calculate kinds and time of gear shifting. The control unit has a ROM, a RAM and a CPU. The control unit 403 outputs a control signal to the actuator 402 to control the shift forks.

The operation of the transmission 400 of the second embodiment will be described below.

At a neutral position, the path shift sleeve 414d is engaged with the dog clutch gear 412a. The first shift sleeve 420a and the second shift sleeve 420b may be positioned anywhere, but the first shift sleeve 420a is engaged with the hub portion 416a and the dog clutch 417a, and the second shift sleeve 420b is engaged with the hub portion 416a and the dog clutch gear 419a in preparation for the next operation. The electric motors/generators are not running.

In order to obtain first speed, the first shift sleeve 420a is moved toward the left side to engage with the hub portion 416a and the dog clutch gear 417a. The second shift sleeve 420b is moved toward the left side to engage with the dog clutch gear 419a and the hub portion 416a. The path shift sleeve 414d is moved toward the right side to engage with the dog clutch gear 412a and the hub 411a.

The power from at least one of the electric motors/generators flows to the input shaft 411, then to the hub 411a. The hub 411a rotates the path shift sleeve 414d, the dog clutch gear 412a, and the first-third drive gear 412. The first-third drive gear 412 drives the first-third driven gear 417b, the sub-shaft 417 and the dog clutch gear 417a. The dog clutch gear 417a rotates the first shift sleeve 420a, the hub portion 416a, the second sleeve 420b, the dog clutch gear 419a and the first-second drive gear 419. The first-second drive gear 419 rotates the first-second driven gear 425b, the differential gears 425 and the drive shafts 423 and 424 at the first speed. FIG. 12 shows a state at the first speed.

In order to obtain second speed from the first speed, the first shift sleeve 420a is engaged with the hub portion 416a and the dog clutch gear 417a, and the second shift sleeve 420b is engaged with the hub portion 416a and the dog clutch gear 419a. That is, its operation is the same as that at the first speed. Then the path shift sleeve 414d is moved toward the left side to engage with the dog clutch gear 413a and the hub 411a.

Figure 13:
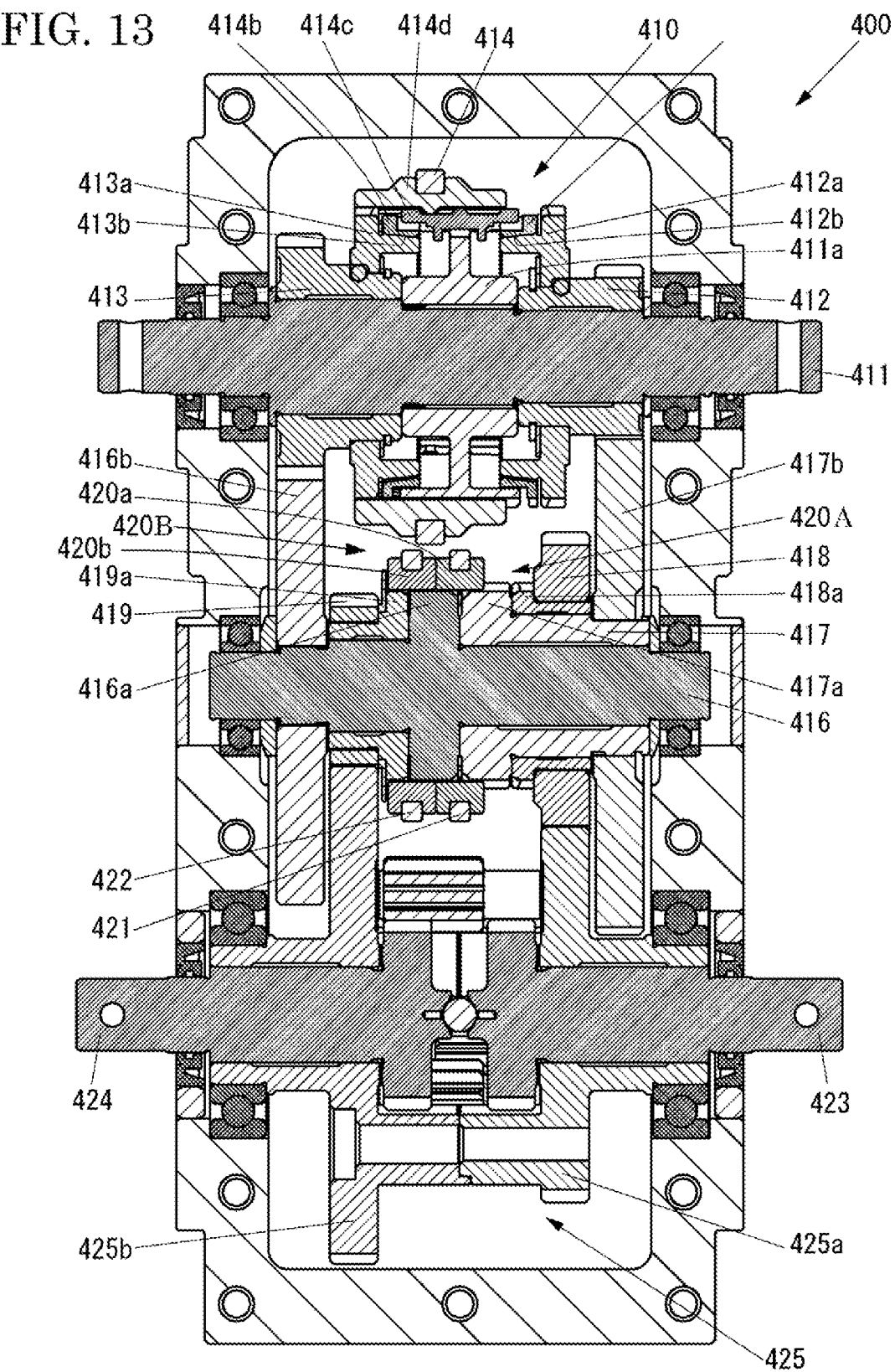
FIG. 13 is a block diagram showing a control system of the transmission shown in FIG. 11.

The power from at least one of the electric motors/generators flows to the input shaft 411, then to the hub portion 411a. The hub 411a drives the path shift sleeve 414d, the dog clutch gear 413a and the second-fourth drive gear 413. The second-fourth drive gear 413 rotates the second-fourth driven gear 416b, the counter shaft 416 and the hub portion 416a. The hub portion 416a rotates the second shift sleeve 420b, the dog clutch gear 419a, and the first-second drive gear 419. The first-second drive gear 419 rotates the first-second driven gear 425b, the differential gears 425 and the drive shafts 423 and 424 at the second speed. FIG. 13 shows a state at the second speed.

In order to obtain third speed from the second speed, the first shift sleeve 420a is moved toward the right side to engage with the dog clutch gear 418a and the dog clutch gear 417a, and the second shift sleeve 420b may be kept engaged with the dog clutch gear 419a. Then the path shift sleeve 414d is moved toward the right side to engage with the dog clutch gear 412a and the hub 411a.

Figure 14:
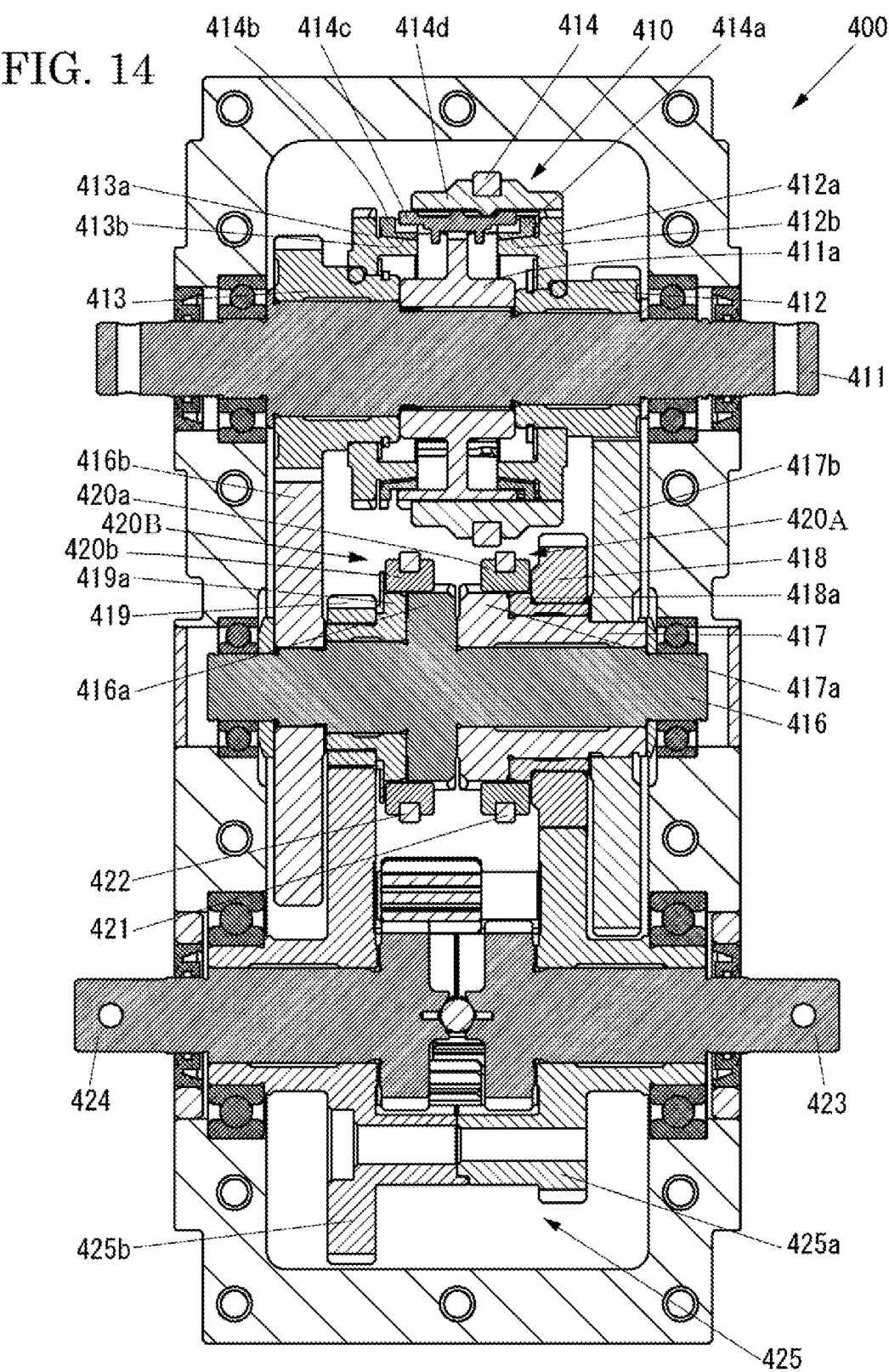
FIG. 14 is a cross-sectional side view showing the FF 4-speed parallel axis type transmission shown in FIG. 11 at second speed.

The power from at least one of the electric motors/generators flows to the input shaft 411, then to the hub 411a. The hub 411a drives the path shift sleeve 414d, the dog clutch gear 412a and the first-third drive gear 412. The first-third drive gear 412 rotates the first-third driven gear 417b, the sub-shaft 417 and the dog clutch gear 417a. The dog clutch gear 417a rotates the first shift sleeve 420a, the dog clutch gear 418a and the third-fourth drive gear 418. The third-fourth drive gear 418 rotates the third-fourth driven gear 425a, the differential gears 425 and the drive shafts 423 and 424 at the third speed. FIG. 14 is a state at the third speed.

In order to obtain fourth speed from the third speed, the first shift sleeve 420a is engaged with the dog clutch gear 418a and the dog clutch gear 417a, and the second shift sleeve 420b is moved toward the right side to engage with the dog clutch gear 417a and the hub portion 416a. Then the path shift sleeve 414d is moved toward the left side to engage with the dog clutch gear 413a and the hub 411a.

Figure 15:
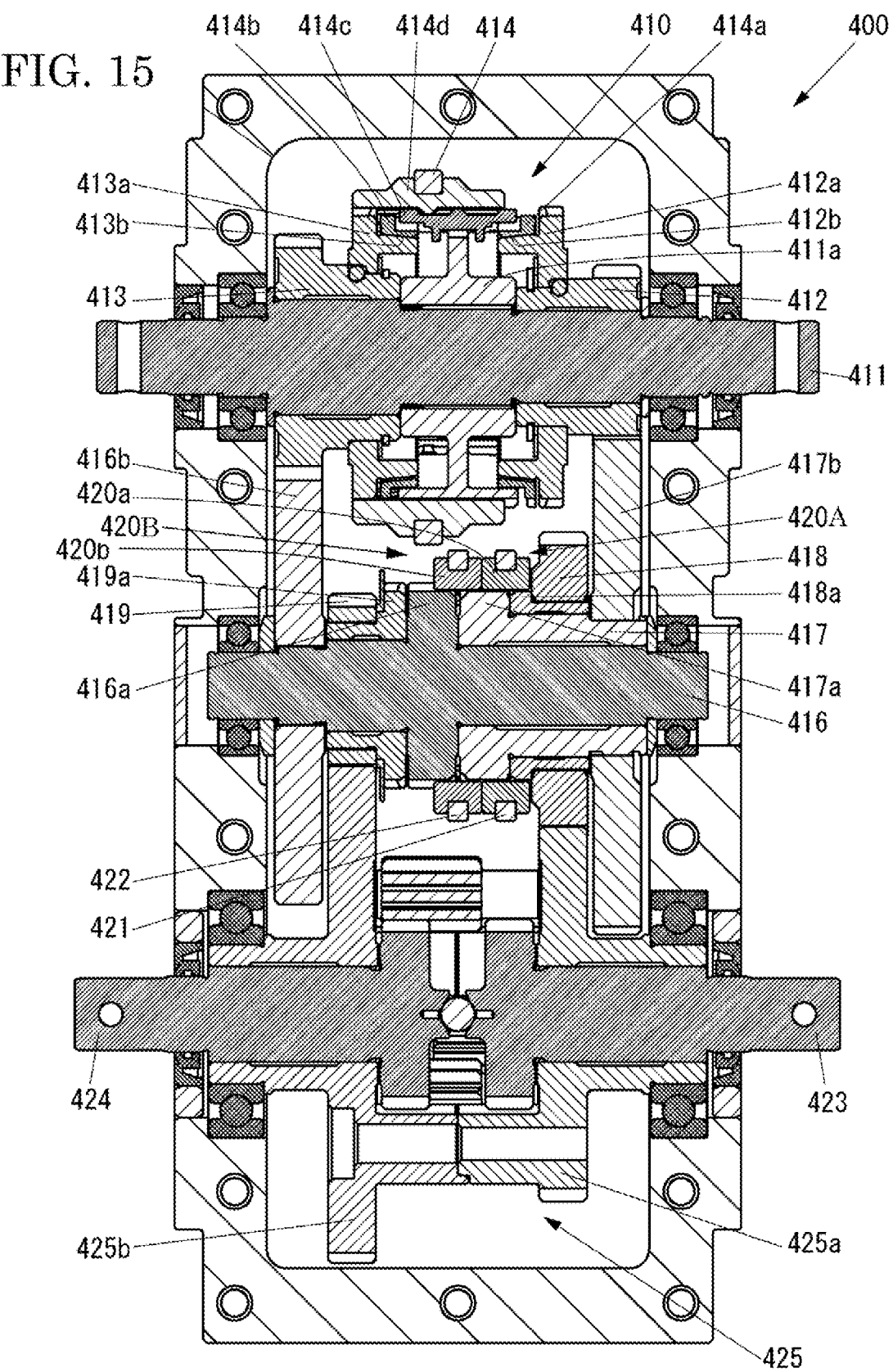
FIG. 15 is a cross-sectional side view showing the FF 4-speed parallel axis type transmission shown in FIG. 11 at third speed.

The power from at least one of the electric motors/generators flows to the input shaft 411, then to the hub 411a. The hub 411a drives the path shift sleeve 414d, the dog clutch gear 413a and the second-fourth drive gear 413. The second-fourth drive gear 413 rotates the second-fourth driven gear 416b, the counter shaft 416 and the hub portion 416a. The hub portion 416a rotates the second shift sleeve 420b, the dog clutch gear 417a, the first shift sleeve 420a, the dog clutch gear 418a and the third-fourth drive gear 418. The third-fourth drive gear 418 rotates the third-fourth driven gear 425a, the differential gears 425 and the drive shafts 423 and 424 at the fourth speed. FIG. 15 is a state at the fourth speed.

In to obtain reverse speed, the first shift sleeve 420a, the second shift sleeve 420b and the path shift sleeve 414d are positioned at the same position as that at the first speed. Then at least one of the electric motors/generators rotates in a reverse direction.

Figure 16:
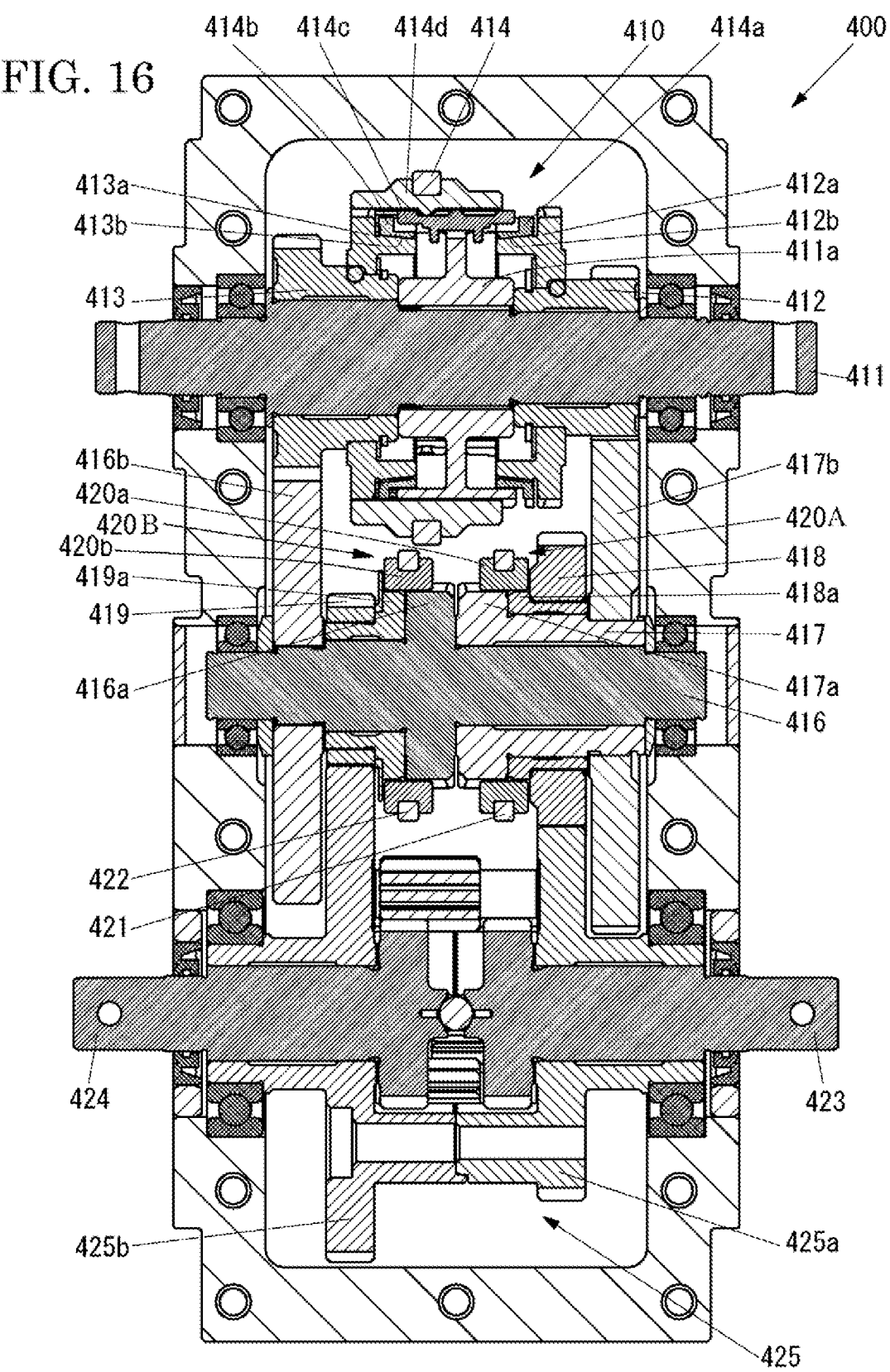
FIG. 16 is a cross-sectional side view showing the FF 4-speed parallel axis type transmission shown in FIG. 11 at fourth speed.

Shifting from the second speed to the third speed, the actuator 402 operates the first gear shifting part 420A to engage the first shift sleeve 420a with the dog clutch gear 418a as shown in FIG. 16. Then the actuator 402 operates to shift the path shifting part 414.

Figure 17:
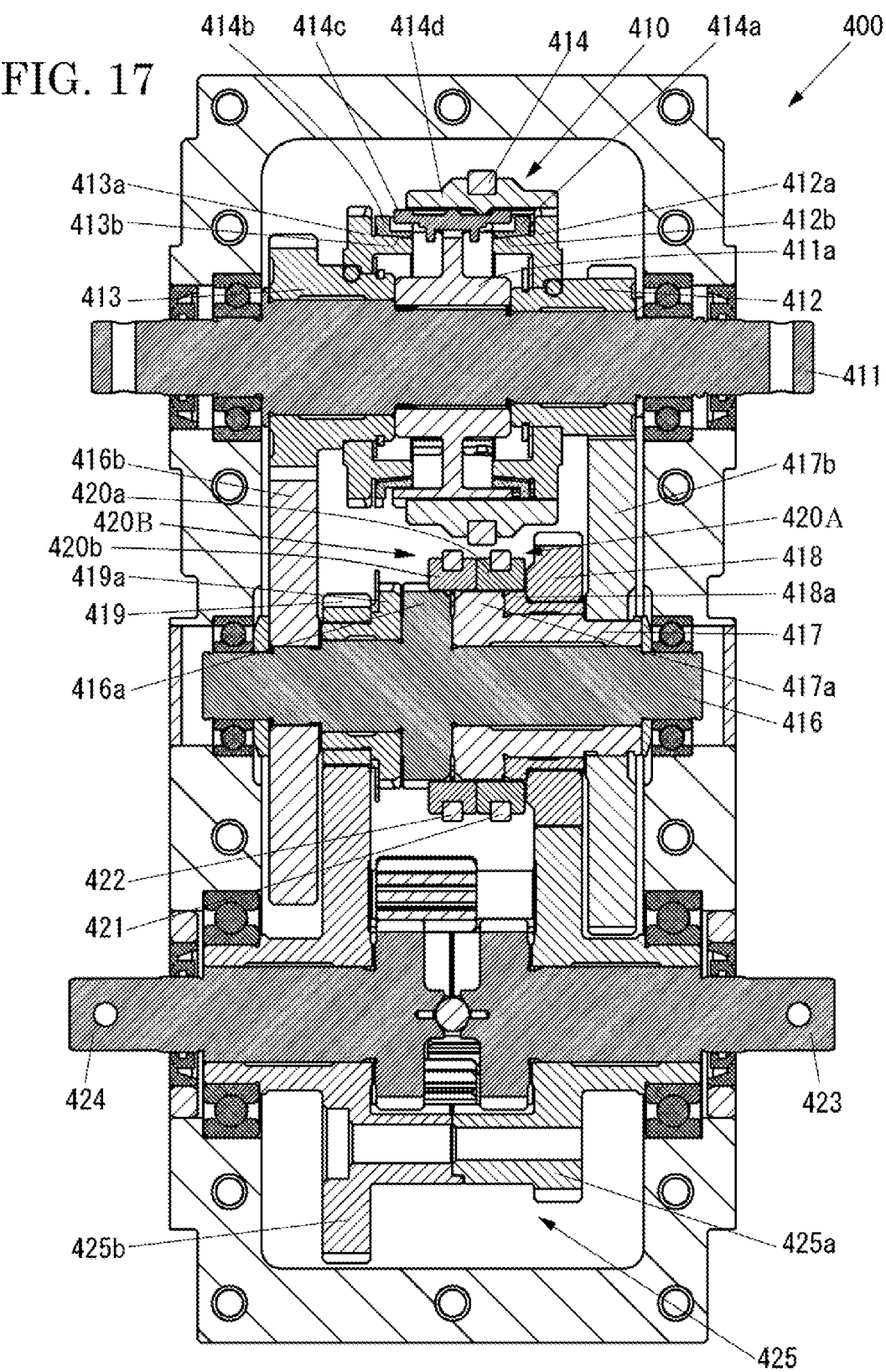
FIG. 17 is a cross-sectional side view showing the FF 4-speed parallel axis type transmission shown in FIG. 11 in a case where it is shifted from the second speed to the third speed.

Shifting from the third speed to the fourth speed, the actuator 402 operates the second gear shifting part 420B to engage the second shift sleeve 420b with the dog clutch gear 417a as shown in FIG. 17. Then the actuator 402 operates to shift the path shifting part 410.

The transmission 400 of the second embodiment has the same advantages as those of the first embodiment in addition to the following one.

The transmission that can suppress cutting off the power and a driver can be suppressed his or her feeling of free running of the motor vehicle.

A reverse gear set is removed because the power unit is the electric motors/generators. The electric motors/generators function to regenerate the power when the motor vehicle is braked. The path shifting part 410 can be quickly shifted because of the length of the path shift sleeve 414d.

While there have been particularly shown and described with reference to preferred embodiments thereof, it will be understood that various modifications may be made therein, and it is intended to cover in the appended claims all such modifications as fall within the true spirit and scope of the invention.

The entire contents of Japanese Patent Applications No. 2016-103156 filed May 24, 2016 and No. 2017-084665 filed Apr. 21, 2017 are incorporated herein by reference.

What is claimed is:
1. A synchromesh mechanism comprising:
   a shaft, the shaft being formed with a hub having splines at a radially outer side;

a first gear that is freely rotatable on the shaft, the first gear having a first dog clutch gear, and the first gear having a first cone portion with a friction surface projecting toward the hub;

a second gear that is freely rotatable on the shaft, the second gear having a second dog clutch gear, and the second gear having a second cone portion with a friction surface projecting toward the hub;

a shift sleeve having splines on an inter surface engaged with the splines of the shaft to relatively move in an axial direction and be engageable with one of the first dog clutch gear and the second dog clutch gear, both end sides of the splines of the shift sleeve having chamfers;

a first synchronizer ring that is arranged between the first cone portion of the first gear and hub, the first synchronizer ring having a frictional surface on an inner surface that is capable of contacting with the first cone portion of the first gear to generate frictional torque, and the first synchronizer ring having splines with chamfers; and a second synchronizer ring that is arranged between the second cone portion of the second gear and the hub, the second synchronizer ring having a frictional surface on an inner surface that is capable of contacting with the second cone portion of the second gear to generate frictional torque, and the second synchronizer ring having splines with chamfers, wherein the shift sleeve has a length such that the chamfers of one of the end sides of the splines of the shift sleeve can contact the chamfers of the splines of the first synchronizer ring and, at a same time, the chamfers of another of the end sides of the splines of the shift sleeve contact the chamfers of the splines of the second synchronizer ring.

2. The synchromesh mechanism according to claim 1, wherein the second dog clutch gear of the second gear has chamfers, and the shift sleeve has the length so that, when the shift sleeve is shifted from an engagement state of the splines of the shift sleeve and the second dog clutch gear of the second gear toward the first gear, the shift sleeve indirectly pushes the first synchronizer ring to contact the frictional surface of first synchronizer ring with the first cone portion of the first gear at least before the chamfers of the splines of the shift sleeve disengage from the chamfers of the second dog clutch of the second gear.

3. The synchromesh mechanism according to claim 2, wherein the shift sleeve has a maximum length so that contact of the second dog clutch gear of the second gear and contact of the chamfers of the splines of the first synchronize ring with the chamfers of the splines of the shift sleeve occur only at different times in a case where the shift sleeve is shifted from an engagement state of the second dog clutch gear of the second gear and the splines of the shift sleeve toward the first gear.

4. The synchromesh mechanism according to claim 3, further comprising:

a plurality of synchronizer keys, each of the synchronizer keys having a projecting portion on an outer side thereof, wherein an inner surface of the shift sleeve has a first circumferential groove and a second circumferential groove in the axial direction, the first circumferential groove and the second circumferential groove have a deepest center portion and slopes extending from the deepest center portion, respectively, and the projecting portions of the synchronizer keys are slidable on one of the first circumferential groove and the second circumferential groove.

5. The synchromesh mechanism according to claim 4, wherein the shift sleeve is alternately shifted according to changing of successive speeds.

6. The synchromesh mechanism according to claim 1, wherein the shift sleeve has a maximum length so that contact of the second dog clutch gear of the second gear and contact of the chamfers of the splines of the first synchronize ring with the chamfers of the splines of the shift sleeve occur only at different times in a case where the shift sleeve is shifted from an engagement state of the second dog clutch gear of the second gear and the splines of the shift sleeve toward the first gear.

7. The synchromesh mechanism according to claim 6, further comprising:

a plurality of synchronizer keys, each of the synchronizer keys having a projecting portion on an outer side thereof, wherein an inner surface of the shift sleeve has a first circumferential groove and a second circumferential groove in the axial direction, the first circumferential groove and the second circumferential groove have a deepest center portion and slopes extending from the deepest center portion, respectively, and the projecting portions of the synchronizer keys are slidable on one of the first circumferential groove and the second circumferential groove.

8. The synchromesh mechanism according to claim 7, wherein the shift sleeve is alternately shifted according to changing of successive speeds.

9. The synchromesh mechanism according to claim 1, further comprising:

a plurality of synchronizer keys, each of the synchronizer keys having a projecting portion on an outer side thereof, wherein an inner surface of the shift sleeve has a first circumferential groove and a second circumferential groove in the axial direction, the first circumferential groove and the second circumferential groove have a deepest center portion and slopes extending from the deepest center portion, respectively, and the projecting portions of the synchronizer keys are slidable on one of the first circumferential groove and the second circumferential groove.

10. The synchromesh mechanism according to claim 9, wherein the shift sleeve is alternately shifted according to changing of successive speeds.

11. The synchromesh mechanism according to claim 1, wherein the shift sleeve is alternately shifted according to changing of successive speeds.

* * * * *